United States Patent
Kim et al.

(10) Patent No.: US 9,774,206 B2
(45) Date of Patent: Sep. 26, 2017

(54) VOLTAGE COMPENSATED ACTIVE CELL BALANCING

(71) Applicant: LINEAR TECHNOLOGY CORPORATION, Milpitas, CA (US)

(72) Inventors: Dave Daekyum Kim, San Jose, CA (US); Robert Jon Milliken, Colorado Springs, CO (US)

(73) Assignee: LINEAR TECHNOLOGY CORPORATION, Milpitas, CA (US)

( * ) Notice: Subject to any disclaimer, the term of this patent is extended or adjusted under 35 U.S.C. 154(b) by 413 days.

(21) Appl. No.: 14/245,390

(22) Filed: Apr. 4, 2014

(65) Prior Publication Data
US 2014/0306662 A1    Oct. 16, 2014

Related U.S. Application Data

(60) Provisional application No. 61/809,192, filed on Apr. 5, 2013.

(51) Int. Cl.
*H02J 7/00* (2006.01)
*H01M 10/42* (2006.01)

(52) U.S. Cl.
CPC .......... *H02J 7/007* (2013.01); *H02J 7/0016* (2013.01); *H01M 2010/4271* (2013.01)

(58) Field of Classification Search
CPC ...... H02J 7/0016; H02J 7/0021; H02J 7/0019; H02J 7/007; G01R 31/3658; H01M 2010/4271; H01M 10/48; H01M 10/482
See application file for complete search history.

(56) References Cited

U.S. PATENT DOCUMENTS

| | | | |
|---|---|---|---|
| 2010/0085009 A1 | 4/2010 | Kang et al. | |
| 2010/0134068 A1* | 6/2010 | Lim | H02J 7/0016 320/116 |

(Continued)

FOREIGN PATENT DOCUMENTS

| | | |
|---|---|---|
| EP | 2339717 A1 | 6/2011 |
| KR | 10-2012-0065293 A | 6/2012 |
| WO | 2004/049540 A2 | 6/2004 |

OTHER PUBLICATIONS

Office Action dated Feb. 3, 2016, in related Chinese Patent Application No. 201410139360.X (English Translation provided).

(Continued)

*Primary Examiner* — Nha Nguyen
(74) *Attorney, Agent, or Firm* — McDermott Will & Emery LLP

(57) ABSTRACT

A monitoring device includes an input terminal configured to receive an input signal from a battery system management (BSM); an output terminal configured to output cell parameters used to determine an open cell voltage associated with one of a plurality of cells within the battery stack connected to the monitoring circuit based on the input signal received from the BSM; a processor; and a memory storing executable instructions for causing the processor to: measure a cell voltage associated with the one of the plurality of cells within the battery stack; measure a voltage drop associated with a measured balancing current; calculate the open cell voltage by adjusting the measured cell voltage based on the measured voltage drop; and balance the battery stack based on the calculated open cell voltage, wherein balancing and calculating the open cell voltage are performed concurrently.

26 Claims, 24 Drawing Sheets

(56) References Cited

U.S. PATENT DOCUMENTS

| | | | | |
|---|---|---|---|---|
| 2012/0098509 A1* | 4/2012 | de Rochemont | ..... | H01F 17/062 |
| | | | | 323/282 |
| 2012/0313439 A1* | 12/2012 | Yamaguchi | ......... | H01M 10/425 |
| | | | | 307/71 |
| 2013/0113432 A1* | 5/2013 | Suzuki | ................. | H02J 7/0014 |
| | | | | 320/134 |
| 2014/0266222 A1* | 9/2014 | Baughman | ............ | H02J 7/0021 |
| | | | | 324/426 |

OTHER PUBLICATIONS

Office Action, dated May 1, 2015, for Korean Patent Application 10-2014-0040717, "Voltage Compensated Active Cell Balancing," Korean counterpart to the instant application. (Partial translation provided).

International Search Report dated Oct. 21, 2014 issued in corresponding EP Patent Application No. 14001261.

D. Tuite, "Chips let electric car makers modularize battery packs," Electronic Design, vol. 61, No. 3, Mar. 7, 2013, pp. 29-31.

Linear Technology, "LT8584f," Jan. 20, 2014, Internet Retrieved from the Internet: URL:http:/www.setron.de/_downloads/produkte/lt/8584f.pdf. [retrieved on Sep. 19, 2014] (entire document).

EP Communication pusuant to Article 94(3) EPC Application No. 14001261.8 dated Feb. 10, 2017.

* cited by examiner

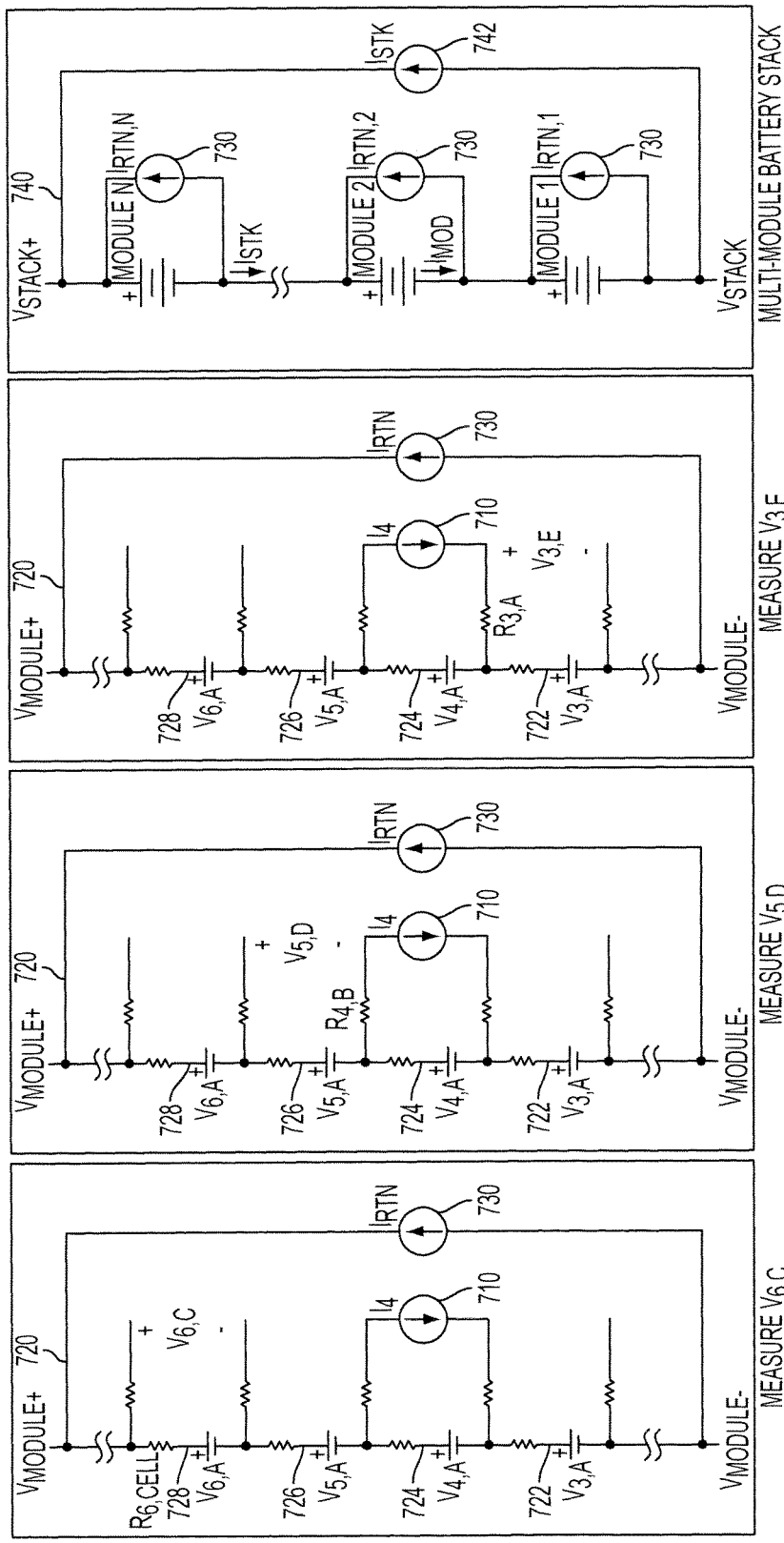

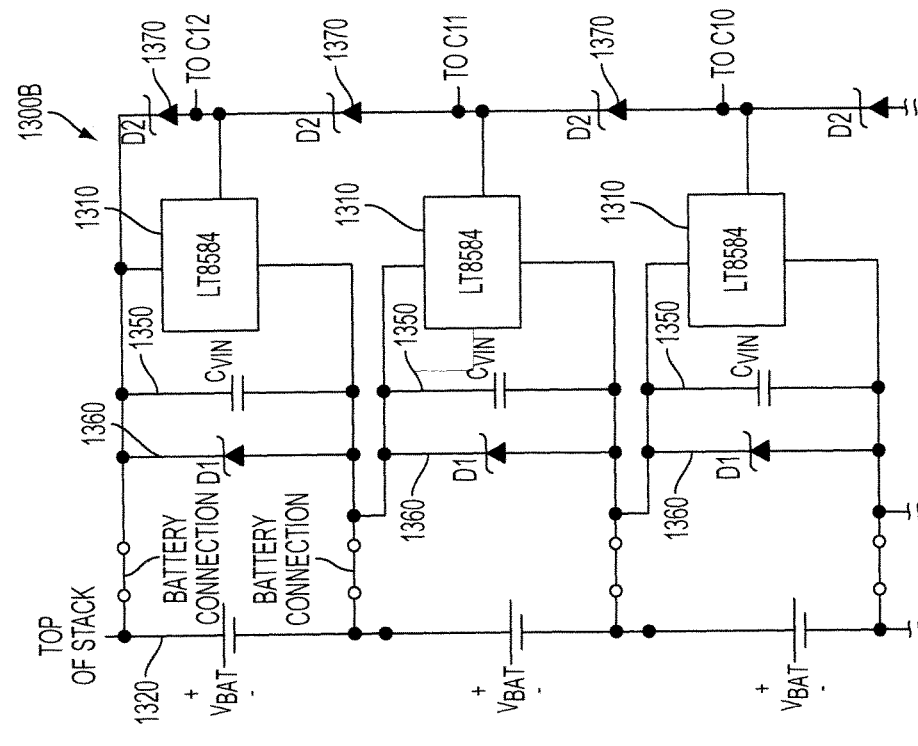
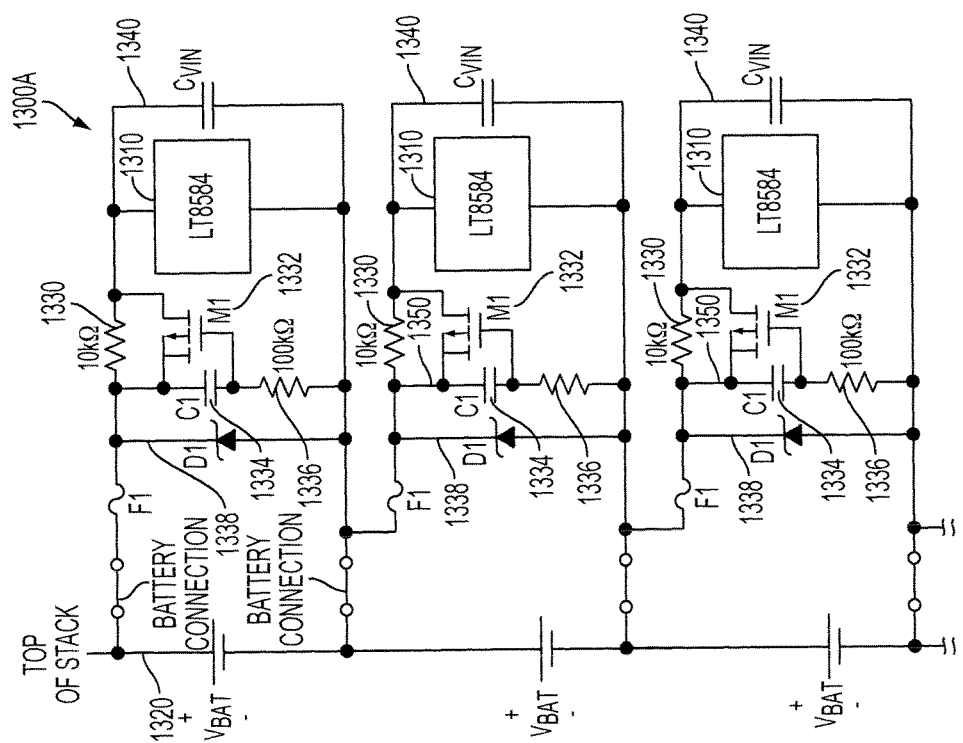

VOLTAGE COMPENSATED ACTIVE CELL BALANCING

RELATED APPLICATIONS

This application claims the benefit of U.S. Provisional Application No. 61/809,192 filed Apr. 5, 2013 entitled "Float Voltage Compensated Active Cell Balancer Maximizes Battery Capacity Recovery and Improves Safety in Battery Stack Module Design" the disclosure of which is incorporated herein by reference.

BACKGROUND

Most battery stack monitors (BSM) directly connect to a battery stack and can only measure individual battery cell voltages. Passive balancing via MOSFETs and resistors are typically used to balance cell voltage and/or cell stored charge. Cell balancing may have to be turned off during battery cell voltage measurement by the BSM; otherwise, significant reading errors may be introduced. This may be due to the IR drop in cable-impedances, interconnect-impedances, cell impedance, and internal battery ESR. Due to these IR drops, cell balancing duty cycle may be reduced or in some cases balancing may not be possible. There are no known alternative methods for compensating IR drops among the battery equivalent series resistance (ESR), cable wire, and connectors for calculating accurate battery float voltage during active or passive balancing. There are methods in the industry for calculating float voltage by compensating for battery ESR during charging and discharging the entire battery stack, but do not apply to balancing during battery cell measurement.

Hence a need exists to enable battery cell voltage measurement by BSM during balancing and overcome measurement error during balancing (e.g., error compensation to cell float voltage), which allows a balancing circuit to safely operate during charge and discharge of the cells, increase balancing duty cycle, and optimizes size and cost of the balancing circuit.

SUMMARY

In one general aspect, the instant application describes a monitoring device configured to monitor an open cell voltage during battery stack balancing. The monitoring device includes an input terminal configured to receive an input signal from a battery system management (BSM); an output terminal configured to output cell parameters used to determine an open cell voltage associated with one of a plurality of cells within the battery stack connected to the monitoring device based on the input signal received from the BSM; a processor; and a memory storing executable instructions for causing the processor to: measure a cell voltage associated with the one of the plurality of cells within the battery stack; measure a voltage drop associated with a measured balancing current; calculate the open cell voltage by adjusting the measured cell voltage based on the measured voltage drop; and balance the battery stack based on the calculated open cell voltage, wherein balancing and calculating the open cell voltage are performed concurrently.

The above general aspect may include one or more of the following features. The monitoring device may be between the BSM and the battery stack and further may include: an integrated power switch; and an analog multiplexer configured to provide on the output terminal a measurable parameter based on the input signal received on the input terminal, the measuring parameter includes a cell voltage of the one of the plurality of the cells within the battery stack with balancing enabled, the cell voltage with balancing disabled, a voltage proportional to balancing current, a voltage proportional to internal die temperature of the monitoring device, and/or a handshake voltage. The handshake voltage may determine the accuracy of measurement readings by the BSM.

The monitoring device may further include a current sense amplifier for measuring a balancing current, wherein memory further stores executable instructions for causing the processor to actively monitor the balancing current of the monitoring device and calculating the voltage drop based on the monitored balancing current to avoid overcharging or undercharging the one of the plurality of the cells during balancing. The monitoring device may include a monolithic flyback DC/DC converter. The memory may further store executable instructions for causing the processor to: activate the monitoring device on a first negative edge of an input signal received on the input terminal, initiate a time window defining a window of time within which the monitoring device is active, count number of negative pulses on the input terminal during the time window, output a handshake voltage on the output terminal corresponding to a last known count of the negative pulses on the input terminal, and output a voltage proportional to a cell parameter based on the number of negative pulses counted once the time window expires.

The monitoring device may be connected to the battery stack via a single-wire battery connection in which a ground connection of the monitoring device to the battery stack shares a common path with a Vcell connection of another monitoring device to the battery stack. The memory may further store executable instructions for causing the processor to calculate the open cell voltage based on a following formula:

$$V_{n,A} = V_{n,B} + I_n \cdot (R_{n-1,A} + R_{n,B}) - I_{n-1} \cdot R_{n-1,B} - I_{n+1} \cdot R_{n,A} + (I_n - I_{MOD}) \cdot R_{n,CELL}$$

where: $V_{n,A}$ is the open cell voltage associated with the one of the plurality of cells, $V_{n,B}$ is the measured cell voltage by the monitoring device for one of the plurality of cells, $R_{n-1,A}$ and $R_{n-1,B}$ are resistances associated with a line connecting a ground terminal of the monitoring device with a negative terminal of the cell, $R_{n,A}$ and $R_{n,B}$ are resistances associated with a line connecting a Vcell pin of the monitoring circuit with a plus terminal of the cell, $R_{n,CELL}$ is a resistance accounting for all impedances not having a shared path with a cell below and a cell above the one of the plurality of cells, $I_n$ is a balancing current associated with the one of the plurality of cells, $I_{n-1}$ is a balancing current associated with the cell below the one of the plurality of cells, $I_{n+1}$ is a balancing current associated with the cell above the one of the plurality of cells, and $I_{MOD}$ is the current simultaneously flowing through the plurality of cells.

The monitoring device may be connected to the battery stack via a two-wire battery connection in which a ground connection of the monitoring device to the battery stack does not share a common path with a Vcell connection of a second monitoring device to the battery stack, the second monitoring circuit being adjacent and below the monitoring circuit. The memory may further store executable instructions for causing the processor to calculate an impedance associated with the monitoring circuit based on a following formula:

$$R_n = \frac{V_{n,MODE0} - V_{n,MODE1} - (I_n - I_{MOD}) \cdot R_{n,CELL}}{I_n},$$

where: $V_{n,MODE0}$ corresponds to a cell voltage of the one of the plurality of cells with the monitoring device being disabled, $V_{n,MODE1}$ corresponds to a cell voltage of one of the plurality of cells with the monitoring device being enabled, $I_n$ is a balancing current associated with the one of the plurality of cells, $I_{MOD}$ is the current simultaneously flowing through the plurality of cells, and $R_{n,CELL}$ is a Direct Current Resistance (DCR) and connection resistance of one of the plurality of cells.

The memory may further store executable instructions for causing the processor to calculate the open cell voltage based on the following formula with two-wire battery connections: $V_{n,A} = V_{n,B} + I_n \cdot R_n + (I_n - I_{MOD}) \cdot R_{n,CELL} - I_{n-1} \cdot R_{n-1}$, where: $V_{n,A}$ is the open cell voltage associated with the one of the plurality of cells, $V_{n,B}$ is the measured cell voltage by the monitoring device for the one of the plurality of cells, $R_n$ is the impedance associated with a $V_{CELL}$ pin of monitoring device connected to the one of the plurality of cells, $R_{n-1}$ is an impedance associated with a monitoring device connected to a cell below the one of the plurality of cells, $R_{n,CELL}$ is the DCR and connection resistance of one of the plurality of cells, $I_n$ is a balancing current associated with the one of the plurality of cells, $I_{n-1}$ is a balancing current associated with the cell below the one of the plurality of cells, and $I_{MOD}$ is the current simultaneously flowing through the plurality of cells.

The memory may further store executable instructions for causing the processor to measure a voltage droop associated with the one of the plurality of cells and calculate the open cell voltage based on the voltage droop and the voltage drop. The voltage droop may be added to the voltage drop in calculating the open cell voltage after threshold amount time of the monitoring device associated with the one of the plurality of cells turns ON.

In another general aspect, the instant application describes a system comprising: a plurality of modules, each module including a battery stack, a monitoring circuit described above for balancing the one of the plurality of cells of the battery stack, and a module system management for measuring the open voltage, wherein the measuring the open cell voltage and balancing the cell are performed concurrently; a module-to-stack balancer coupled to the plurality of modules and including a plurality of balancers each associated with one of the plurality of modules, the module-to-stack balancer configured to balance a voltage or stored charge among the modules.

In another general aspect, the instant application describes an IR compensated active cell balancing method comprising steps of: receiving an input signal at an input terminal of a monitoring device and from a battery system management (BSM); responsive to the input signal, activating the monitoring device for balancing one of the plurality of cells within a battery stack coupled to the monitoring device; measuring a cell voltage associated with one of the plurality of cells; measuring a voltage drop associated with a measured balancing current; calculating via a processor an open cell voltage associated with the one of the plurality of cells by adjusting the measured cell voltage based on the measured voltage drop; and balancing the battery stack based on the processor calculated open cell voltage, wherein balancing and calculating the open cell voltage are performed concurrently.

The above general aspect may include one or more of the following features. The method may further include providing on the output terminal a measurable parameter based on the input signal received on the input terminal, wherein the measuring parameter includes a cell voltage of the one of the plurality of the cells within the battery stack with balancing enabled, the cell voltage with balancing disabled, a voltage proportional to balancing current, a voltage proportional to internal die temperature of the monitoring device, and/or a handshake voltage. The method may further include actively monitoring the balancing current of the monitoring device; and calculating the voltage drop based on the monitored balancing current to avoid overcharging or undercharging the one of the plurality of the cells during balancing.

The monitoring device may include a monolithic flyback DC/DC converter. Activating the monitoring device may include activating the monitoring device on a first negative edge of an input signal received on the input terminal, the method further comprising: initiating a time window defining a window of time within which the monitoring device is active; counting number of negative pulses on the input terminal during the time window; and outputting a handshake voltage on the output terminal corresponding to a last known count of the negative pulses on the input terminal; and outputting a voltage proportional to a cell parameter based on the number of negative pulses counted once the time window has expired. Calculating the open cell voltage may include calculating the open voltage based on the following formula:

$$V_{n,A} = V_{n,B} + I_n \cdot (R_{n-1,A} + R_{n,B}) - I_{n-1} \cdot R_{n-1,B} - I_{n+1} \cdot R_{n,A} + (I_n - I_{MOD}) \cdot R_{n,CELL}$$

where: $V_{n,A}$ is the open voltage associated with the one of the plurality of cells, $V_{n,B}$ is the measured cell voltage by the monitoring device for the one of the plurality of cells, $R_{n-1,A}$ and $R_{n-1,B}$ are resistances associated with a line connecting a ground terminal of the monitoring device with a negative terminal of the cell, $R_{n,A}$ and $R_{n,B}$ are resistances associated with a line connecting a Vcell pin of the monitoring circuit with a plus terminal of the cell, $R_{n,CELL}$ is a resistance accounting for all impedances not having a shared path with a cell below and a cell above the one of the plurality of cells, $I_n$ is a balancing current associated with the one of the plurality of cells, $I_{n-1}$ is a balancing current associated with the cell below the one of the plurality of cells, $I_{n+1}$ is a balancing current associated with the cell above the one of the plurality of cells, and $I_{MOD}$ is the current simultaneously flowing through the plurality of cells in a module including the monitoring device and the BSM.

The method may further include calculating an impedance associated with the monitoring circuit for calculating the open cell voltage based on the following formula:

$$R_n = \frac{V_{n,MODE0} - V_{n,MODE1} - (I_n - I_{MOD}) \cdot R_{n,CELL}}{I_n},$$

where: $V_{n,MODE0}$ corresponds to a cell voltage of the one of the plurality of cells with the monitoring device being disabled, $V_{n,MODE1}$ corresponds to a cell voltage of the one of the plurality of cells with the monitoring device being enabled, $I_n$ is a balancing current associated with the one of the plurality of cells, $I_{MOD}$ is the current simultaneously flowing through the plurality of cells, and $R_{n,CELL}$ is a Direct Current Resistance and connection resistance of one of the plurality of cells.

Calculating the open cell voltage may include calculating the open voltage based on the following formula: $V_{n,A} = V_{n,B} + I_n \cdot R_n + (I_n - I_{MOD}) \cdot R_{n,CELL} - I_{n-1} \cdot R_{n-1}$, where: $V_{n,A}$ is open cell voltage associated with the one of the plurality of cells, $V_{n,B}$ is a measured cell voltage by the monitoring device for the one of the plurality of cells, $R_n$ is the impedance associated with the Vcell pin of monitoring device connected to the one of the plurality of cells, $R_{n-1}$ is an impedance resistance associated with a monitoring device connected to a cell below the one of the plurality of cells, $R_{n,CELL}$ is the DCR and connection resistance of one of the plurality of cells, $I_n$ is a balancing current associated with the one of the plurality of cells, $I_{n-1}$ is a balancing current associated with the cell below the one of the plurality of cells, and $I_{MOD}$ is the current simultaneously flowing through the plurality of cells in a module including the monitoring device and the BSM.

In another general aspect, the instant application describes a monitoring device comprising: an input terminal configured to receive an input signal from a battery system management (BSM); an output terminal configured to output cell parameters used to determine an open cell voltage associated with one of a plurality of cells within the battery stack connected to the monitoring circuit based on the input signal received from the BSM; a processor; and a memory storing executable instructions for causing the processor to: measure a cell voltage associated with the one of the plurality of cells within the battery stack; measure a voltage drop associated with a measured balancing current; calculate the open cell voltage by adjusting the measured cell voltage based on the measured voltage drop; calculate capacity associated with the one of the plurality of cells; calculate stored charge of the one of the plurality of cells based on the calculated capacity; balance the battery stack based on the calculated stored charge, wherein balancing and calculating the open cell voltage are performed concurrently.

The memory may further store executable instructions for causing the processor to calculate the capacity based on a following formula:

$$Capacity_n = \left(\frac{1}{\Delta \% \ SOC_n}\right) \cdot \Delta Q_n,$$

where: $\Delta Q_n$ represents amount of change in the stored charge in the one of the plurality of cells within a time period, $\Delta \% \ SOC_n$ represents percentage change in the State of Charge (SOC) of the one of the plurality of cells within the time period, and $Capacity_n$ represents capacity of the one of the plurality of cells.

To calculate the open cell voltage, the memory may further store executable instructions to calculate a first open cell voltage and a second open cell voltage and to calculate the percentage change in the SOC, the memory further stores executable instructions to utilizes a look-up table configured to correlate the first open cell voltage with a first percentage SOC and the second open cell voltage with the second percentage SOC such that the difference between the first percentage SOC and the second percentage SOC corresponds to the percentage change in the SOC. The memory may further store executable instructions for causing the processor to calculate the capacity based on a following formula: $Q_n = \% \ SOC_n \cdot Capacity_n$, where: $\% \ SOC_n$ represents percentage SOC of the one of the plurality of cells, and $Capacity_n$ represents capacity of the one of the plurality of cells.

These general and specific aspects may be implemented using a system, a method, or a computer program, or any combination of systems, methods, and computer programs.

The details of one or more implementations are set forth in the accompanying drawings and the description below. Other features will be apparent from the description and drawings, and from the claims.

BRIEF DESCRIPTION OF THE DRAWINGS

The drawing figures depict one or more implementations in accord with the present teachings, by way of example only, not by way of limitation. In the figures, like reference numerals refer to the same or similar elements.

FIGS. 7A-7C illustrate graphical representations of calculating channel impedances of the monitoring integrated circuit having the single-wire configuration shown in FIG. 1;

FIG. 7D illustrates a macro view of the entire stack having more than one module;

FIGS. 13A and 13B illustrate two exemplary hotswapping protection circuits each providing an active solution for protecting against hotswapping the battery stack into the BMS board;

DETAILED DESCRIPTION

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

The monitoring integrated circuit of the instant application may be configured to accurately monitor open cell voltage during battery stack balancing, loading and charging. The monitoring integrated circuit may be a monolithic flyback DC/DC converter designed to actively balance high voltage stacks of batteries. In one implementation, the DC/DC converter may be of any configuration including but not limited to a flyback converter. The high efficiency of a switching regulator may significantly increase the achievable balancing current while reducing heat generation. Active balancing may allow for capacity recovery in stacks of mismatched batteries, a feat that may not be attainable with passive balancing systems. In a typical system, greater than 99% of the total battery capacity may be recovered. The charge removed from the individual cell can be returned to the top of stack, to any combination of cells, or to an external rail.

The monitoring integrated circuit may include an integrated 6 A, 50V power switch, reducing the design complexity of the application circuit. The monitoring integrated circuit may run completely off of the cell which it is discharging, removing the need for complicated biasing schemes commonly required for external power switches. The monitoring integrated circuit includes an analog multiplexer (MUX) and may be placed between the battery stack and the BSM. The enable pin (DIN) of the monitoring integrated circuit may be designed to work seamlessly with a BSM. The monitoring integrated circuit may provide several measurable parameters to the input of the BSM. The measurable parameters may include the cell voltage with balancing disabled, cell voltage with balancing enabled, a voltage proportional to the balancing current, a voltage proportional to balancer internal die temperature, and/or several reference voltages. The monitoring integrated circuit may allow measurement and/or calculation of cell voltage, balancing/discharge current, redundant reference, internal fault modes, cell impedance, cable impedance, interconnect impedance, and/or open cell voltage during balancing.

Reference now is made in detail to the examples illustrated in the accompanying drawings and discussed below.

Figure 1:
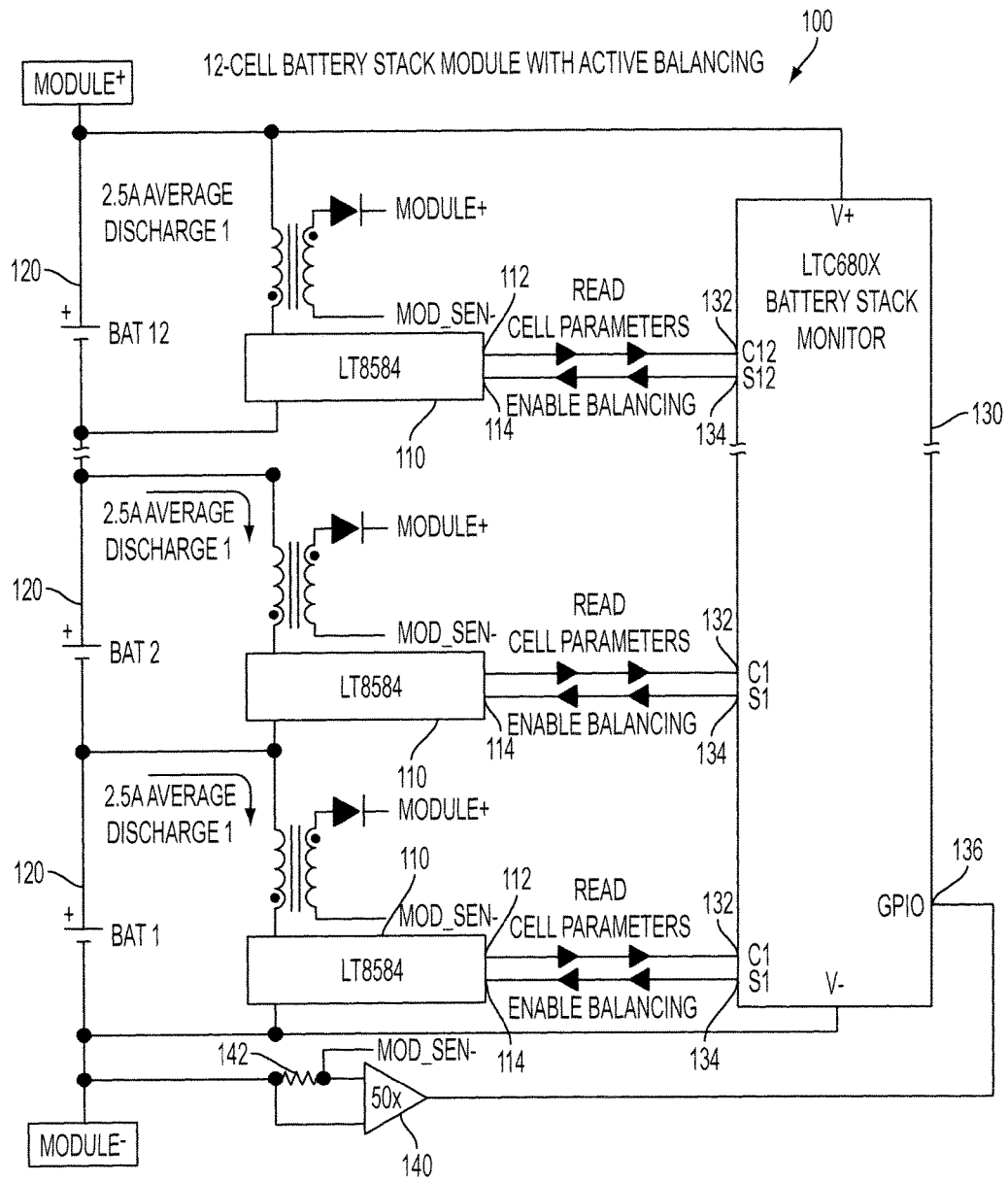
FIG. 1 illustrates an exemplary battery management system (BMS)

FIG. 1 illustrates an exemplary battery management system (BMS) 100. The BMS 100 includes a monitoring integrated circuit 110, a BSM chip 130, and a module current senses amplifier 140. The monitoring integrated circuit 110 is in communication with a battery stack module 120 and the BSM chip 130. The BSM chip 130 may be thought of as an accurate volt meter and is configured to convert the measured analog voltage of the battery cells in the battery stack module 120 and analog output of the module current sense amplifier 140 to a digital data that can be read by a CPU or a microprocessor. The monitoring integrated circuit 110, in one example, includes a LT8584. However, communication between the BSM chip 130 and the monitoring integrated circuit 110 is not limited to the scheme used by the LT8584 and other types of communication between monitoring integrated circuit 110 and BSM chip 130 may be used.

The BSM chip 130, in one specific example, includes LTC680x family of voltage monitoring ICs having 12 channels for measuring 12 battery cells in the battery stack module 120 and several General Purpose Input/Output ("GPIO") channels that may be configured as analog inputs or digital inputs or outputs. Each of the 12 channels of the BSM chip 130 includes two pins. The two pins include a C pin 132 and a S pin 134. The C pin 132 is dedicated for reading battery cell measurement parameters from the monitoring integrated circuit 110. The S pin 134 is dedicated for enabling and communicating with the monitoring integrated circuit 110. The monitoring integrated circuit 110 may be an active or a passive balancing circuit. The passive balancing circuit implementing MOSFETs and resistors are typically used to balance voltages by bleeding out energy from the cells having a voltage higher than a specified threshold. To this end, the passive balancing may dissipate a lot of heat and may not be able to take advantage of energy recovery. Also, the resistors in the passive balancing circuit may get hot, thereby allowing only a limited amount of current that could be discharged. Furthermore, the passive balancing circuits can drastically reduce the amount of charge that can be removed from a battery cell in the battery stack module 120.

Instead of the passive balancing circuit, in another implementation, the monitoring integrated circuit 110 may be an active balancing circuit. The monitoring integrated circuit 110 is inserted between the battery stack module 120 and the BSM chip 130 and includes an output pin 112 and an input pin 114. The input pin 114 is connected to the S pin 134 of the BSM chip 130 and is configured to receive the enabling signal from the S pin 134. The output pin 112 is connected to the C pin 132 and is configured to provide various measurements to the BSM chip 130 via the C pin 132. The various measurements include voltage or discharge current taken off the battery cell with the monitoring integrated circuit 110 being ON or voltage with the monitoring integrated circuit 110 being OFF. The voltage measurement with the monitoring integrated circuit 110 being ON or OFF along with the current measurement during the cell discharge enables the processor to determine the impedance of the connection between the monitoring integrated circuit 110 and the battery cell.

The monitoring integrated circuit 110 is configured to monitor open cell voltage during battery stack balancing, loading and charging. Presently, there is no known mechanism that can perform balancing while actively monitoring open cell voltage. This is due to the significant errors introduced in the voltage measurement due to the IR drops associated with the connections between the monitoring integrated circuit 110 and the battery stack module 120. The monitoring integrated circuit 110 can measure the IR drops and therefore can accurately measure the cell voltage by compensating for the IR drops. The monitoring integrated circuit 110 may be able to monitor the balancing current actively and by calculating the IR drops may be able to avoid overcharging or undercharging a battery cell in the battery stack module 120. Similarly, the monitoring integrated circuit 110 may be able to avoid removing more or less than a specified threshold from a battery cell in the battery stack module 120. The charge removed from the individual cell can be returned to the top of stack, to any combination of cells, or to an external rail.

To illustrate one specific example, assume that there is a weak cell, which is aged more than the other cells in the battery stack module 120. During the charging process, the weak cell will likely get charged and sometimes over charged before the other cells because it has lesser capacity to retain charge due to erosion. When the charge of the weak cell reaches above a certain threshold, without the monitoring integrated circuit 110, the charging operation may be discontinued to avoid overcharging the weak cell and damaging the battery stack module 120. As a result, the weak cell may be charged within an acceptable threshold but the remaining cells in the battery stack module 120 may be undercharged. Instead of discontinuing the charging operation, the monitoring integrated circuit 110 for the weak cell redistributes the energy from the weak cell to the entire battery stack module 110. The monitoring integrated circuit 110 may continue this process until all cells are charged within an acceptable threshold. Similarly, when the battery is being discharged, the weak cell may be discharged more quickly than the other cells in the battery stack module 110. In this scenario, the monitoring integrated circuit 110 redistribute charge from the other cells in the battery stack module 120 and to all the cells until all cells are discharged within an acceptable threshold, allowing all charge in stack to be utilized.

In one specific example, the monitoring integrated circuit 110 is a monolithic flyback DC/DC converter designed to actively balance high voltage stacks of batteries. The high efficiency of a switching regulator significantly increases the achievable balancing current while reducing heat generation. To this end, the active balancing of the monitoring integrated circuit 110 is superior to a traditional passive balancing circuit. The active balancing also allows for capacity recovery in stacks of mismatched batteries, a feat unattainable with passive balance systems. In a typical system, greater than 99% of the total battery capacity may be recovered. The monitoring integrated circuit 110 includes an integrated 6 A, 50V power switch, reducing the design complexity of the application circuit. The part may run completely off of the cell which it is discharging, removing the need for complicated biasing schemes commonly required for external power switches. The enable pin (DIN) of the part is designed to work seamlessly with any battery stack voltage monitoring ICs.

Figure 2:
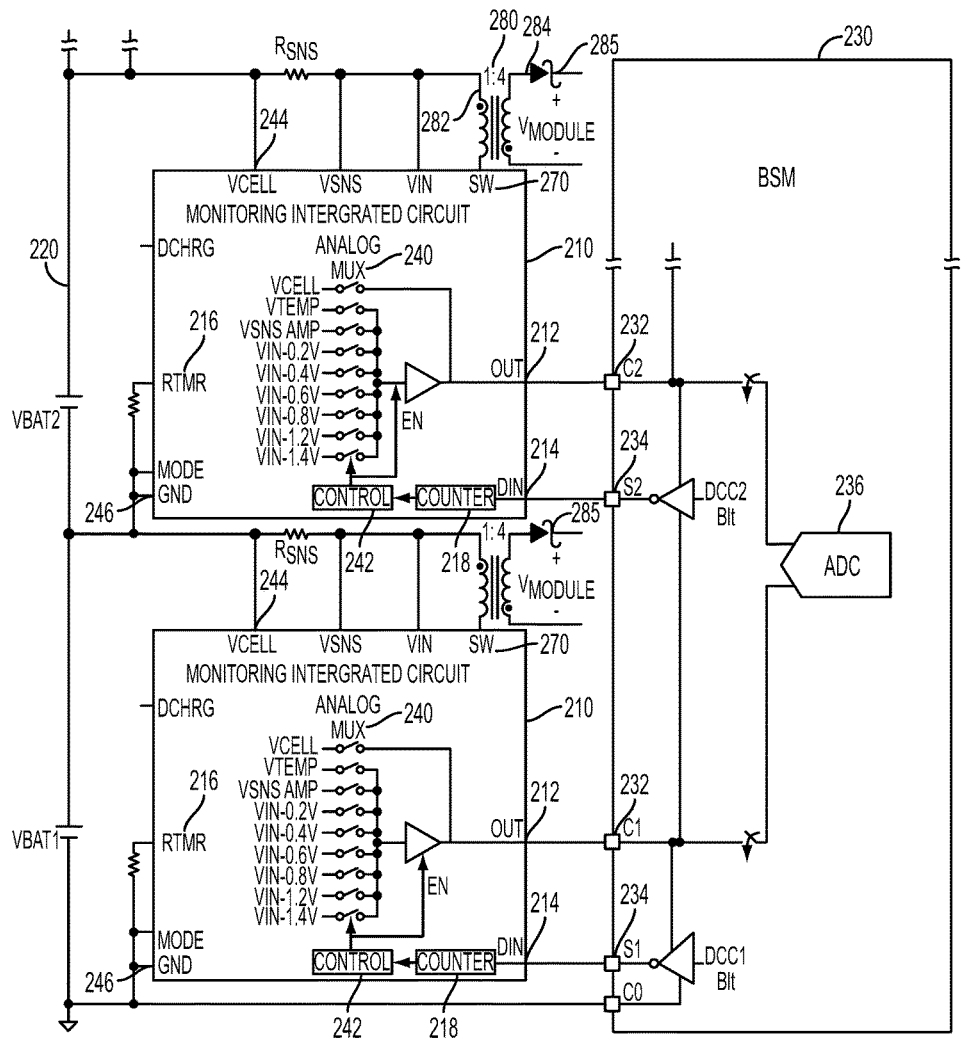
FIG. 2 illustrates an exemplary configuration of an exemplary monitoring integrated circuit shown in FIG. 1.

FIG. 2 illustrates an exemplary configuration of a monitoring integrated circuit. The monitoring integrated circuit 210 is configured to allow for measurement and/or calculation of cell voltage, balancing/discharge current, redundant references, internal fault modes, cell impedance, cable impedance, interconnect impedance, and open cell voltage during balancing.

The monitoring integrated circuit 210 is connected to the BSM 230 and includes an output pin 212, an input pin 214, a resistor timer 216, a counter 218, an analog mux 240, a control 242. The output pin 212 is connected to a C port, 232, of the BSM' 230 passive balancing port (e.g., any C port labeled C1, C2, etc., 232) and is selected. The input pin 214 is connected to any S port labeled S1, S2, etc., 234, of the BSM 230. The input pin 214 may be integrated with any BSM 230 on the market. The input pin 214 may be used to program the monitoring integrated circuit 210. The input into the analog mux can be integrated with any BSM 230 on the market. The program instructions may be delivered from the S pin 234 of the BSM 230. The counter 218 is configured to count the number of negative edge of the input signal received from the BSM 230 and pass the count to the control 242. The control 242 based on the count selects one of the possible outputs of the analog mux 240. The outputs of the analog mux include VSNS (voltage proportional to balancing current), VTEMP (voltage proportional to temperature), Vin−0.2 v, Vin−0.4 v, Vin−0.6 v, Vin−0.8 v, Vin−1.2 v, and Vin−1.4 v, or VCELL.

The monitoring integrated circuit 210 also includes a switch pin 270 coupled to a transformer 280 having a primary winding 282 and a secondary winding 284. The primary winding 282 is connected to the switch pin 270 at one end and at the other end is connected to the plus terminal of a battery cell in the battery stack 220 through resistor Rsns. The secondary winding 284 is connected at one end to the negative terminal of the battery stack 220 and at the other end to the positive terminal of the battery stack 220 through a series connected diode 285.

Figure 3A:
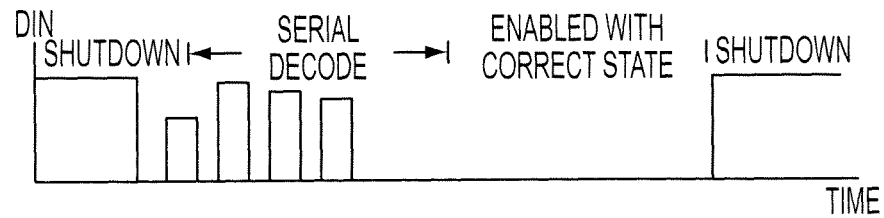
FIGS. 3A-3C illustrate an exemplary basic communication architecture that may be used to program the monitoring integrated circuit shown in FIG. 1.
Figure 3B:
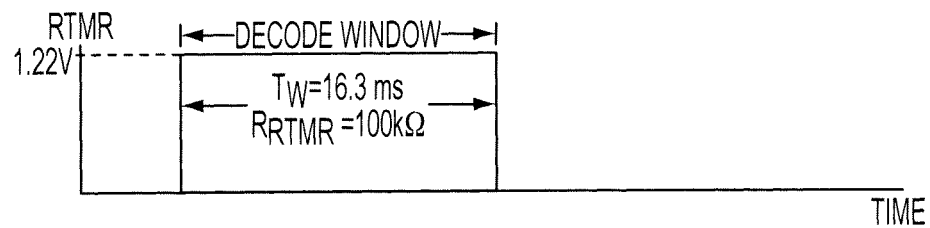
Figure 3C:
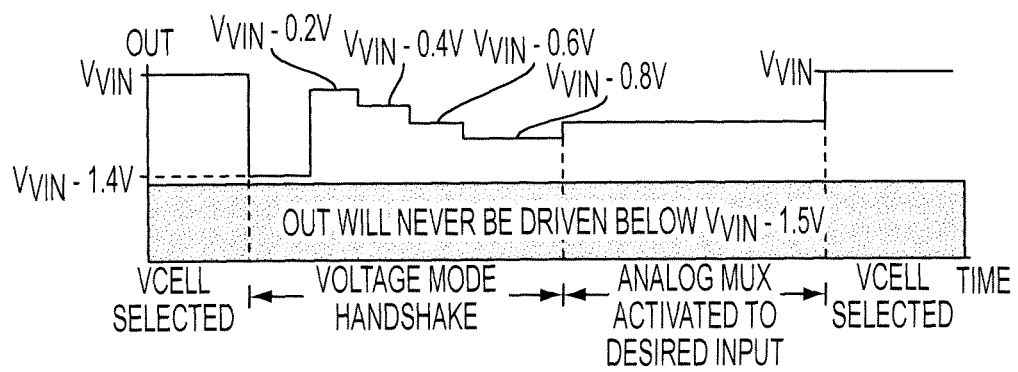

FIGS. 3A-3C illustrate an exemplary basic communication architecture that may be used to program the monitoring integrated circuit 210. However, the presented disclosure also applies to other communication methods for programming the monitoring integrated circuit 210. Referring to FIG. 3A, the communications between the BSM 230 and the monitoring circuit 210 may begin with the input pin 214 signal kept high. The input pin 214 signal being high keeps the monitoring integrated circuit 210 in the shutdown mode. The first negative edge of the input pin 214 activates the monitoring integrated circuit 210 and starts an internal decode window TW. Referring also to FIG. 3B, the internal decode window TW defines the time window within which the monitoring integrated circuit 210 is actively counting negative edges on pin 214. This allows the input pin 214 to be toggled for communicating serial data without resetting the part. The internal decode window TW may be adjusted using the R timer pin 216. In one example, the resistance of the R timer pin 216 is 100 k, which translates to the internal decode window TW of 16.3 milliseconds, nominally. As the resistance of the R timer pin 216 increases, the internal decode window TW also increases. For example, if the resistance of the R timer pin 216 is increased to 200 k, the internal decode window TW is increased to 32.6 milliseconds, nominally.

Referring also to FIG. 3C, during the internal decode window TW, the monitoring integrated circuit 210 counts pulses received on the input pin 214 from the S pin of the BSM 230 using the counter 218 and controls the output the handshake voltage of analog mux 240 on the output pin 212 using a control 242. When the internal decode window TW expires, the monitoring integrated circuit 210 locks the last known count and outputs the analog MUX voltage on the output pin 212. There are four active modes the user may select as shown in Table 1.

TABLE 1

Serial Mode States

| COUNT | MODE | DISCHARGER STATE | MUX OUTPUT | HANDSHAKE VOLTAGE (VIN-VOUT) |
|---|---|---|---|---|
| Part Disabled | 0 | Disabled | VCELL | N/A |
| 0 | Fault | Disabled | VFAULT | 1.4 |
| 1 | 1 | Enabled | VCELL | 0.2 |
| 2 | 2 | Enabled | VSNS | 0.4 |
| 3 | 3 | Enabled | VTEMP | 0.6 |
| 4 | 4 | Disabled | VTEMP | 0.8 |
| ≥5 | Fault | Disabled | VFAULT | 1.4 |

Handshaking is accomplished by reading the analog voltage on the output pin 212. Handshaking voltages are asserted on the negative edge of the input pin 214 signal, corresponding to the serial decode count. Count 0 starts when the first negative voltage is seen on the input signal 214. In this scenario, the mux output voltage would be Vin−1.4 and the handshake voltage is 1.4V. At count 1, the mux output voltage would be Vin−0.2V and the handshake voltage is 0.2V. At count 2, the mux output voltage would be Vin−0.4V and the handshake voltage is 0.4V. At count 3, the mux output voltage would be Vin−0.6V and the handshake voltage is 0.6V. At count 4, the handshake voltage would be Vin−0.8V and the handshake voltage is 0.8V. Once the decode window TW expires and RTMR pin returns to ground, three actions are initiated: the output pin 212 switches to the desired measurement, the monitoring integrated circuit 210 begins discharging the connected cell depending on selected mode in Table 1, and the input power latch disables. In one implementation, the monitoring integrated circuit 210 may only be disabled after the decode window TW has expired and the input pin 214 has been taken high.

In automotive applications, where people may heavily rely on the accuracy of voltages, the handshake voltages outputted from the monitoring integrated circuit 210 may be used as a reference to check the accuracy of the BSM 230. The handshake voltages are previously set in the monitoring integrated circuit 210 and may be used as a basis to determine whether the voltage output from the BSM 230 is accurate.

All parameters including handshake voltages, VSNS, and VTEMP are extracted differentially by taking two sequential measurements and doing a subtraction. This may be done to protect the BSM 230 from exceeding its internal maximum voltage threshold. The BSM 230 may have an approximate maximum rating for the input to the C pin 232. If this threshold (e.g., 8 volts) is exceeded, which is the typical threshold limit for many BSMs, the BSM may be damaged. Therefore, the measurement output from the monitoring integrated circuit 210 is referenced to Vcell to avoid exceeding the threshold voltage of the BSM 230. Because the output voltage of the monitoring integrated circuit 210 is referenced with respect to the Vcell, differential measurement should be taken to extract the desired voltages (e.g., handshake voltages, voltage proportional to balancing current, voltage proportional to temperature) from the monitoring integrated circuit 210. The differential measurement may be performed by the analog-digital converter 236, which takes analog voltage measurements from adjacent monitoring integrated circuits 210 and outputs a digitized voltage measurement.

Figure 4:
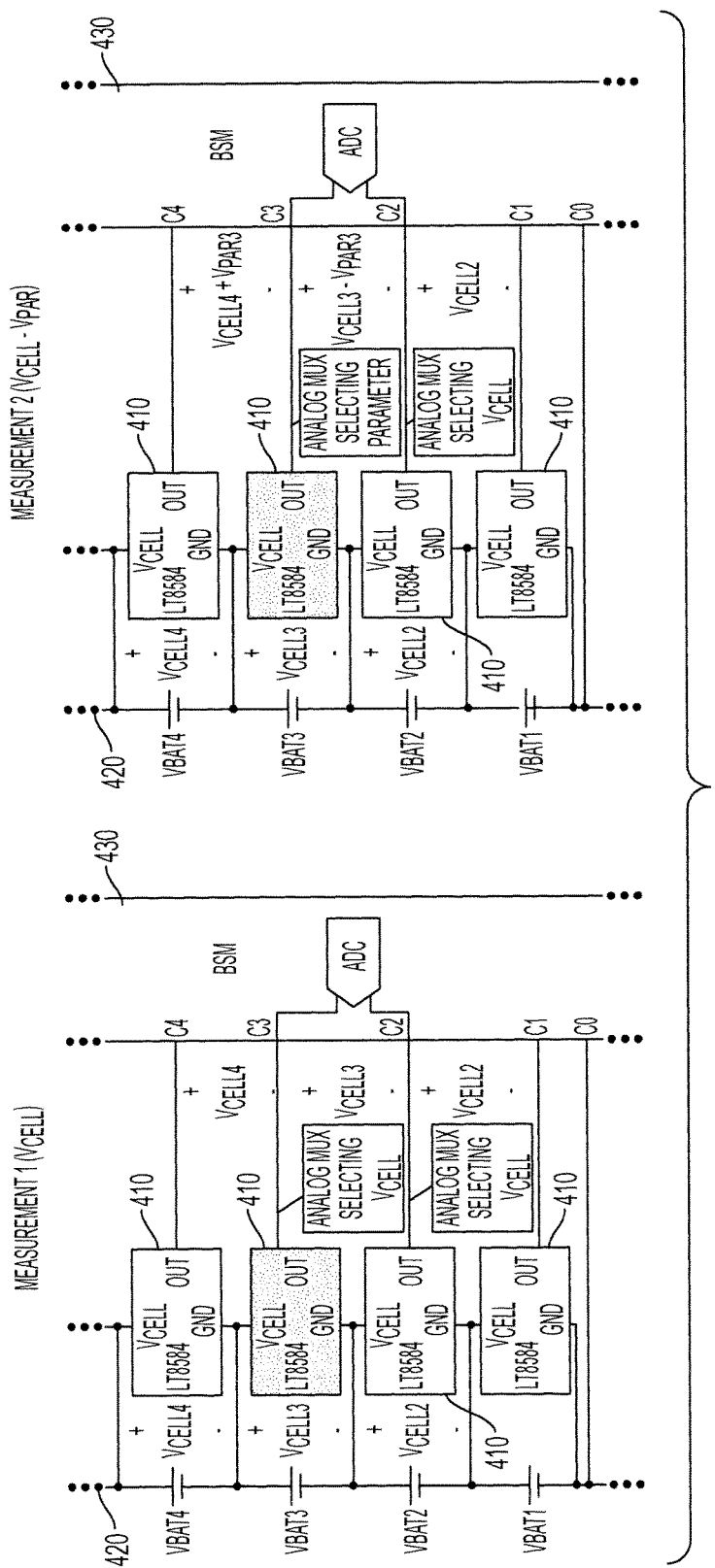
FIG. 4 illustrates an exemplary method for extracting a given parameter, $V_{PAR}$, from the highlighted monitoring integrated circuit shown in FIG. 1.

FIG. 4 illustrates an exemplary method for extracting a given parameter, $V_{PAR}$, from the highlighted monitoring integrated circuit. The monitoring integrated circuit 410 directly below the monitoring integrated circuit 410 under measurement may be forced to select Vcell (MODE 0 or MODE 1) and becomes the negative reference for both sequential measurements. Selecting Vcell for the first measurement may be performed by entering either MODE 0 (balancer disabled) or MODE 1 (balancer enabled). Table 2 may be referenced to determine which Vcell to reference for a given parameter.

TABLE 2

MODE Selection during Differential Measurements

|  | Serial Mode State | |
|---|---|---|
| Desired Parameter | 1st Measurement | 2nd Measurement |
| Handshake Voltage | MODE 0 | During Decode Window |
| VSNS | MODE 1 | MODE 2 |
| VTEMP, Balancer Enabled | MODE 1 | MODE 3 |
| VTEMP, Balancer Disabled | MODE 0 | MODE 4 |

$$V_{PAR} = 1^{st}\text{ Measurement} - (2^{nd}\text{ Measurement}) = V\text{CELL} - (V\text{CELL} - V_{PAR}) \quad \text{(Equation 1)}$$

Referring again to FIG. 4, a BSM channel above the channel under measurement will have a voltage higher than that of a standard cell. The monitoring integrated circuit 410 may be configured to protect the BSM's 430 C inputs and to ensure that they will never be stressed beyond their absolute maximum rating.

Figure 5A:
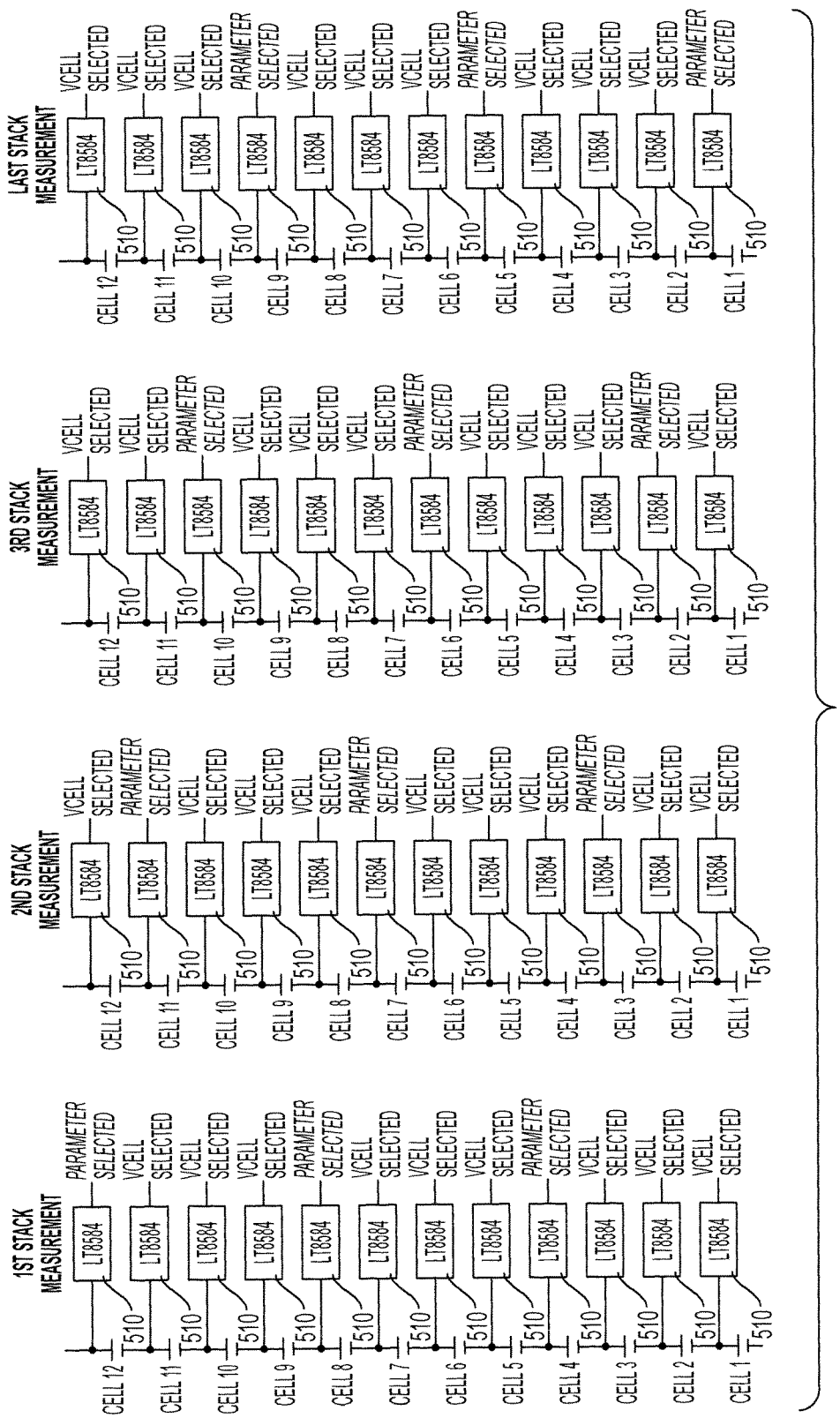
FIG. 5A illustrates an exemplary process for determining handshake voltages of the monitoring integrated circuit shown in FIG. 1 measuring every $4^{th}$ channel per module at a time.
Figure 5B:
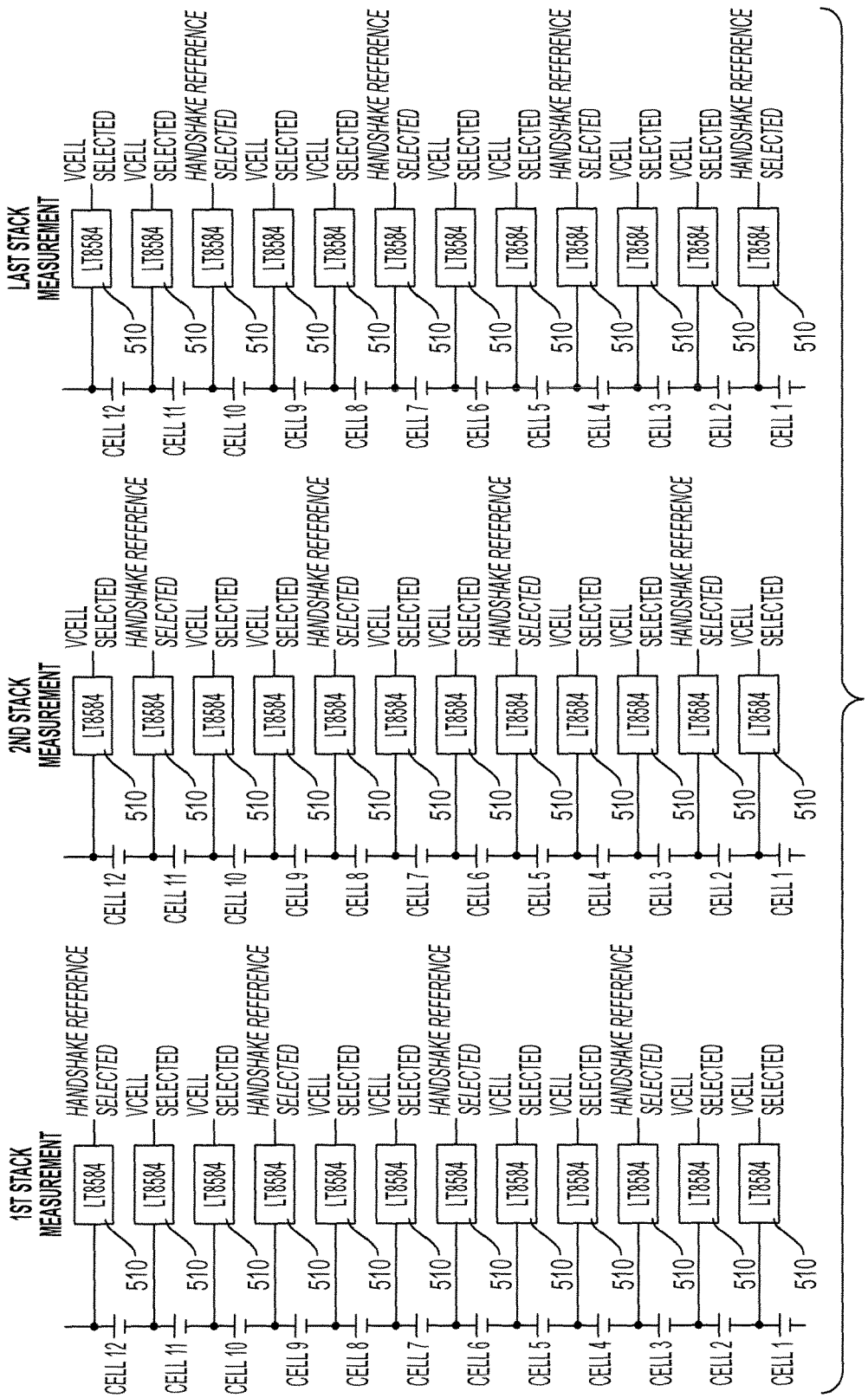
FIG. 5B illustrates an exemplary process for determining handshake voltages of the monitoring integrated circuit shown in FIG. 1 measuring every $3^{rd}$ channel per module at a time.

FIGS. 5A-5B illustrate an exemplary processes for determining handshake voltages of the monitoring integrated circuit 510. The handshake voltage may be used to verify that the BSM's internal reference is working properly for all input channels. The reference voltages internal to 510 are independent of the BSM IC and are mutually exclusive, providing true redundancy. Each handshake level may be 2.5% accurate over temperature. To identify a handshake voltage, the monitoring integrated circuit 510 may be turned on by taking its DIN pin low (assert S-pin) without sending subsequent S-pin pulses. This may keep the monitoring integrated circuit 510 in fault mode with the 1.4V handshake asserted on the out pin. This handshake may remain on the out pin during the decode window and may be latched once the decode window expires. The fault mode may be removed by taking the S-pin high after the decode window expires. In this case, 1.4 v handshake voltage level was used as a reference, however, other handshake voltage level may be used as a reference as well.

Every fourth channel per BSM module may be measured at time. FIG. 5A shows an algorithm for efficiently measuring all handshake voltages using four full-stack measurements. This method applies to multiple BSM module systems where all $4^{th}$, $8^{th}$ and $12^{th}$ channels from each 12-cell BSM are simultaneously read for the $1^{st}$ stack measurement. Likewise, all $3^{rd}$, $7^{th}$ and $11^{th}$ channels are simultaneously read from all BSM modules in the stack for the $2^{nd}$ stack measurement and so forth. This stagger method applies to reading other parameters including current, temperature, and cell voltage with balancers on. FIG. 5B shows an alternative measurement method where every third channel's balancing current is enabled. The method in FIG. 5B requires only three full-stack measurements to extract all parameters. It may be used for faster acquisition; however, it may be susceptible to common-mode errors. All channel cell voltages with balancers off can be read simultaneously.

It is important that the voltage of the battery cell that is being measured represents the actual voltage taking into account IR drop due to the monitoring integrated circuit 110 discharging current. When the monitoring integrated circuit 110 is enabled and the corresponding channel is being balanced, the measured voltage for that channel is going to be lower than the actual voltage associated with that channel. Furthermore, the cell to the left and/or the cell to the right of the active cell with the monitoring integrated circuit 110 being enabled may have slightly higher voltages than the measured voltages corresponding to those cells. To illustrate one specific example, assume the battery stack includes three cells: Cell 1, Cell 2, and Cell 3. The Cell 1 may be located below Cell 2; the Cell 2 may be located between Cell 1 and 3; and the Cell 3 may be located above Cell 2. Further assume that all three cells are at maximum threshold battery level of 3 volts and therefore none of them needs to be balanced. If the voltage associated with the Cell 2 suddenly increases to 3.2 volts for some reason, the Cell 2 may need to be balanced to reduce its voltage to the threshold level of 3 volts or below the threshold level of 3 volts. To this end, the monitoring integrated circuit connected to Cell 2 may be activated. The monitoring integrated circuit of Cell 1 and Cell 3 may remain off since their voltages are still at 3 volts.

When the monitoring integrated circuit for Cell 2 is turned on and the voltage on Cell 2 is measured, the voltage may be measured as 3 volts. In reality, however, the voltage is still at 3.2 since no energy has yet been transferred from Cell 2 to any other Cell or other locations outside of the battery stack. The measured voltage of 3 volts is due to the IR drops associated with the activated monitoring integrated circuit. The BSM reads the 3 volts and concludes there is no need for balancing and deactivates the monitoring integrated circuit. Once the monitoring integrated circuit is turned off, the voltage of Cell 2 again jumps to 3.2, which would turn the monitoring integrated circuit on again and the system may be caught in this infinite loop due to not considering the IR drop caused by the impedance associated with the activated monitoring integrated circuit. The Cell 1 might actually read 3.1 volts when the monitoring integrated circuit for Cell 2 is activated. Therefore, the balancing integrated circuit for Cell 1 may be activated; however, in reality Cell 1 may not require balancing since the extra voltage shown is due to the monitoring integrated circuit of Cell 2 being active.

There are several ways for providing a more accurate balancing and measurement. First, the balancing and voltage measurement can be separated. The system can balance, turn off balancing, and then measure voltages. This may help avoid inaccuracies introduced in measuring voltages due the IR drops associated with the impedance of the activated monitoring integrated circuit. In this implementation, however, there may not be a constant visibility between the BSM and the battery stack. Therefore, this implementation may introduce the possibility of overshooting a cell, may increase the amount of balancing that is actually needed, and may increase the balancing time, especially with the long settling time of cell terminal voltage.

In another implementation, the balancing and measurement are performed concurrently while taking into account for IR drop associated with the impedances of the activated integrated monitoring circuit. This system may accurately calculate the IR drop and compensate for the IR drop during the measurement. As such, the actual voltage of the cell may be determined and balancing can be performed based on the actual voltage instead of the measured voltage. In keeping with the previous example, the actual voltage of 3.2 volts for Cell 2 instead of the measured voltage of 3.0 volts when the monitoring integrated circuit is activated may be used when performing balancing. To this end, the monitoring integrated circuit may not need to turn off when measuring voltage. In this implementation, the BSM may have constant visibility to the battery stack, the balancing time may be enhanced, the balancing current and balancer weight may be reduced, and the possibility of overshooting a cell may be greatly reduced.

Algorithms for calculating impedances associated with the monitoring integrated circuit may depend on the methods used to connect the monitoring integrated circuit to the battery stack. There are two methods used to connect the monitoring integrated circuit to the battery stack. The two methods include a single-wire battery connection and a two-wire battery connection.

Figure 6A:
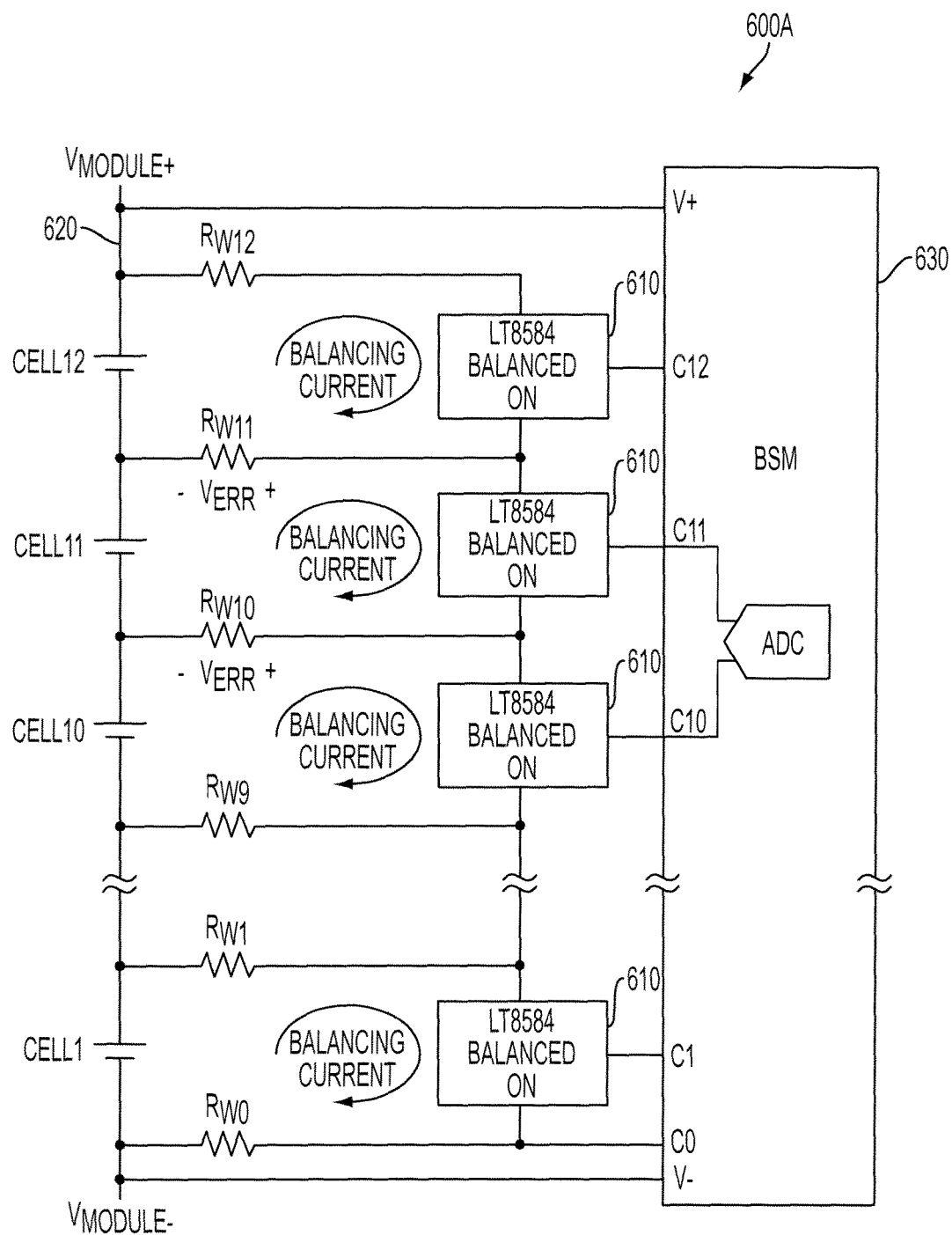
FIG. 6A illustrates a single-wire battery connection between the monitoring integrated circuit and the battery stack shown in FIG. 1.
Figure 6B:
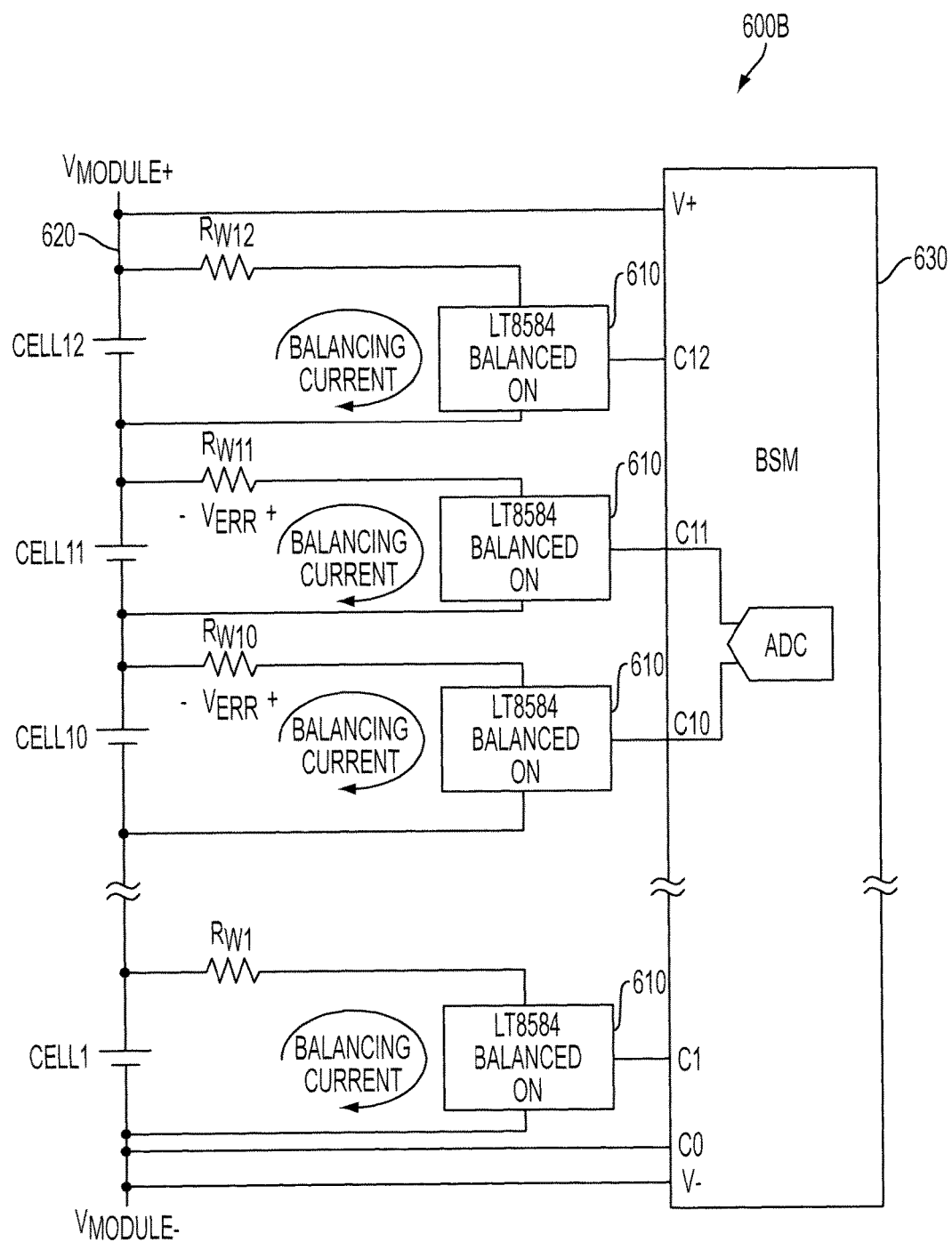
FIG. 6B illustrates a two-wire battery connection between the monitoring integrated circuit and the battery stack.

FIG. 6A illustrates a single-wire battery connection 600A between the monitoring integrated circuit 610 and the battery stack 620. FIG. 6B illustrates a two-wire battery connection 600B between the monitoring integrated circuit 610 and the battery stack 620. The single-wire connection 600A may be recommended due to complete system visibility of the wire connection impedance. The single-wire connection 600A may also be cheaper and more reliable due to fewer wire connections. In the single-wire connection 600A the ground connection of the monitoring integrated circuit 610 to the battery stack 620 shares a common path with the Vcell connection of the adjacent monitoring integrated circuit 610 to the battery stack 620. In the two-wire connection 600B, the ground connection of the monitoring integrated circuit 610 to the battery stack 620 is separate from the Vcell connection of the adjacent monitoring integrated circuit 610 to the battery stack 620.

Note that in the two-wire connection scheme, the ground connection impedance cannot be determined when calculating wire impedance and will be invisible to the BSM 630. With the exception of C0, the connection of the monitoring integrated circuit 610 for other cells to the ground or the minus potential of the battery cell is not shared with the adjacent cell, which is measured by the BSM 630 in the single-wire connection scheme. As such, the BSM 630 loses visibility to the ground connection impedance. On the flip side, the algorithms for computing two-wire connection impedance and back calculating the open cell voltage during discharging are more straightforward than algorithms for computing single-wire connection impedance and back calculating the open cell voltage during the discharging. The two-wire method also has the advantage of losing visibility of a single cell during an open connection instead of two as in the single-wire method.

FIGS. 7A-7C illustrate graphical representations of calculating cell and channel impedances of the monitoring integrated circuit having the single-wire configuration and FIG. 7D illustrates a macro view of the entire stack having more than one module. Specifically, FIG. 7A illustrates a graphical representation for calculating cell impedance. FIG. 7B illustrates a graphical representation for calculating channel impedance in the line connecting the plus terminal of the battery cell to the monitoring integrated circuit. FIG. 7C illustrates a graphical representation for calculating channel impedance in the line connecting the ground or minus terminal of the battery cell to the monitoring integrated circuit. In FIGS. 7A-7C, the battery stack 720 is shown to include four cells 722, 724, 726, and 728. Although not shown, the battery stack 720 may include other cells. Each cell may be associated with a monitoring integrated circuit 710. In the illustrated implementation, the monitoring integrated circuit 710 for the cell 724 is on and therefore it is shown in FIGS. 7A-7C. The monitoring integrated circuit for the cells 722, 726, and 728 are off and therefore they are not shown in FIGS. 7A-7C.

When the monitoring integrated circuit 710 is on, current flows through the interconnected resistors associated with the monitoring integrated circuit 710 (e.g., resistors R4,B, R3,A, and R6,CELL). The resistor R4,B corresponds to a resistance in the line connecting the plus terminal of battery cell 724 to the Vcell 244 of the monitoring integrated circuit as shown in FIG. 2. The resistor R3,A corresponds to a resistance in the line connecting the minus terminal of the battery cell 724 to the ground 246 of the monitoring integrated circuit as shown in FIG. 2. The R6,CELL is called the cell impedance and it includes all other impedances that only channel 6 have that are not common to its adjacent channels. For example, there may be some area on the Printed Circuit Board (PCB) and in the stack connection that only channel 6 may encounter. Although the above example has been described with respect to channel 4, this method may be applied to every channel in the stack to obtain impedances associated with each channel. $I_{RTN}$, 730, represents all charge returned to the module via the DC/DC converter, and in this case, the flyback converter of circuit 110. The current $I_{RTN}$ is measured with sense resistor 142 and circuit 140 driving the analog input channel 136 of circuit 130 shown in FIG. 1.

To calculate the resistance for each of the resistors associated with the monitoring integrated circuit 710, the following Equations 2 may be used for the single-wire configuration, using stack measurement method shown in FIG. 5A:

This algorithm allows the calculation of the open cell voltage (float voltage) during balancing, stack loading, and stack charging operation accurately taking into account the impedances associated with the active balancers. Thus, system visibility is not lost during cell balancing, and the balancer duty cycle may be drastically increased.

The open cell voltage ($V_{n,A}$) correction calculation may require the use of two measured impedances for each battery connection. This may be due to the relative current measurement error between each adjacent channel. The one-impedance method may work well when the current used to calculate impedance is the only active current path. For instance, if Cell 4 was used to measure $R_4$ and only Cell 4 is turned on, the corrected cell voltage may be very accurate. However, if Cell 5 is turned on at the same time or even by itself, the corrected cell voltage on channel 4 may have an error upwards of 5 mV. The worst case may be if Cell 4 current error is at the lowest error threshold and Cell 5 current error is at the maximum threshold.

The above equations give the means to remove the current accuracy error from the corrected cell voltage calculation. Three impedance values are obtained with an active cell, $R_{n-1,A}$, $R_{n,B}$, and $R_{n,CELL}$. The cell voltages above, below, as well as the active cell are recorded and used to calculate the impedances. The third impedance, called cell impedance, accounts for all impedance that does not have a shared path with the cells above or below. This includes internal battery impedance and the connection between batteries. Note that $R_0$ and $R_{12}$ are special cases and can be calculated by combining equations from Set A and Set B. $I_{MOD,m}$ is the module current flowing simultaneously through all cells within the module where m designates the measurement step shown in FIG. 5a, where m equal to 1 designates the first stack, m equal to 2 designates the second stack, and m equal to 3 designates the third stack in FIG. 5a. $I_{MOD,m}$ is equal to $I_{STK}$ 742+$I_{RTN}$ 730 where $I_{STK}$ (shown in FIG. 7D) is the

| Equations for Cell Resistance | Equations for Resistance Set B (I Below) |
|---|---|
| CELL 12: $R_{12,CELL} = (V_{12,C} - V_{12,A})/I_{MOD,3}$ | CELL 12: $R_{12} = \{V_{12,A} - V_{12,MODE1} - (I_{12} - I_{MOD,1}) \cdot R_{12,CELL}\}/I_{12} - R_{11,A}$ |
| CELL 11: $R_{11,CELL} = (V_{11,C} - V_{11,A})/I_{MOD,4}$ | CELL 11: $R_{11,B} = (V_{12,D} - V_{12,A} - I_{MOD,2} \cdot R_{11,CELL})/I_{11}$ |
| CELL 10: $R_{10,CELL} = (V_{10,C} - V_{10,A})/I_{MOD,1}$ | CELL 10: $R_{10,B} = (V_{11,D} - V_{11,A} - I_{MOD,3} \cdot R_{10,CELL})/I_{10}$ |
| CELL 9: $R_{9,CELL} = (V_{9,C} - V_{9,A})/I_{MOD,2}$ | CELL 9: $R_{9,B} = (V_{10,D} - V_{10,A} - I_{MOD,4} \cdot R_{9,CELL})/I_9$ |
| CELL 8: $R_{8,CELL} = (V_{8,C} - V_{8,A})/I_{MOD,3}$ | CELL 8: $R_{8,B} = (V_{9,D} - V_{9,A} - I_{MOD,1} \cdot R_{8,CELL})/I_8$ |
| CELL 7: $R_{7,CELL} = (V_{7,C} - V_{7,A})/I_{MOD,4}$ | CELL 7: $R_{7,B} = (V_{8,D} - V_{8,A} - I_{MOD,2} \cdot R_{7,CELL})/I_7$ |
| CELL 6: $R_{6,CELL} = (V_{6,C} - V_{6,A})/I_{MOD,1}$ | CELL 6: $R_{6,B} = (V_{7,D} - V_{7,A} - I_{MOD,3} \cdot R_{6,CELL})/I_6$ |
| CELL 5: $R_{5,CELL} = (V_{5,C} - V_{5,A})/I_{MOD,2}$ | CELL 5: $R_{5,B} = (V_{6,D} - V_{6,A} - I_{MOD,4} \cdot R_{5,CELL})/I_5$ |
| CELL 4: $R_{4,CELL} = (V_{4,C} - V_{4,A})/I_{MOD,3}$ | CELL 4: $R_{4,B} = (V_{5,D} - V_{5,A} - I_{MOD,1} \cdot R_{4,CELL})/I_4$ |
| CELL 3: $R_{3,CELL} = (V_{3,C} - V_{3,A})/I_{MOD,4}$ | CELL 3: $R_{3,B} = (V_{4,D} - V_{4,A} - I_{MOD,2} \cdot R_{3,CELL})/I_3$ |
| CELL 2: $R_{2,CELL} = (V_{2,C} - V_{2,A})/I_{MOD,1}$ | CELL 2: $R_{2,B} = (V_{3,D} - V_{3,A} - I_{MOD,3} \cdot R_{2,CELL})/I_2$ |
| CELL 1: $R_{1,CELL} = (V_{1,C} - V_{1,A})/I_{MOD,2}$ | CELL 1: $R_{1,B} = (V_{2,D} - V_{2,A} - I_{MOD,4} \cdot R_{1,CELL})/I_1$ |

Equations for Resistance Set A (I Above)

| | | | |
|---|---|---|---|
| CELL 12: | $R_{11,A} = \{V_{11,E} - V_{11,A} - I_{MOD,1} \cdot R_{11,CELL}\}/I_{12}$ | $V_{n,A} =$ | MODE0 measured cell voltage with balancer disabled |
| CELL 11: | $R_{10,A} = \{V_{10,E} - V_{10,A} - I_{MOD,2} \cdot R_{10,CELL}\}/I_{11}$ | | |
| CELL 10: | $R_{9,A} = \{V_{9,E} - V_{9,A} - I_{MOD,3} \cdot R_{9,CELL}\}/I_{10}$ | $V_{n,B} =$ | MODE1 measured cell voltage with balancer enabled |
| CELL 9: | $R_{8,A} = \{V_{8,E} - V_{8,A} - I_{MOD,4} \cdot R_{8,CELL}\}/I_9$ | | |
| CELL 8: | $R_{7,A} = \{V_{7,E} - V_{7,A} - I_{MOD,1} \cdot R_{7,CELL}\}/I_8$ | $V_{n,C} =$ | MODE0 voltage with no adjacent cells active, used to calculate $R_{n,CELL}$ |
| CELL 7: | $R_{6,A} = \{V_{6,E} - V_{6,A} - I_{MOD,2} \cdot R_{6,CELL}\}/I_7$ | | |
| CELL 6: | $R_{5,A} = \{V_{5,E} - V_{5,A} - I_{MOD,3} \cdot R_{5,CELL}\}/I_6$ | | |
| CELL 5: | $R_{4,A} = \{V_{4,E} - V_{4,A} - I_{MOD,4} \cdot R_{4,CELL}\}/I_5$ | $V_{n,D} =$ | MODE0 voltage with lower adjacent cell active (excluding cell 1), used to calculate $R_{n,B}$ |
| CELL 4: | $R_{3,A} = \{V_{3,E} - V_{3,A} - I_{MOD,1} \cdot R_{3,CELL}\}/I_4$ | | |
| CELL 3: | $R_{2,A} = \{V_{2,E} - V_{2,A} - I_{MOD,2} \cdot R_{2,CELL}\}/I_3$ | | |
| CELL 2: | $R_{1,A} = \{V_{1,E} - V_{1,A} - I_{MOD,3} \cdot R_{1,CELL}\}/I_2$ | $V_{n,E} =$ | MODE0 voltage with upper adjacent cell active (excluding cell 12), used to calculate $R_{n,A}$ |
| CELL 1: | $R_0 = \{V_{1,A} - V_{1,MODE1} - (I_1 - I_{MOD,4}) \cdot R_{1,CELL}\}/I_1 - R_{1,B}$ | | | current common to all cells in entire battery stack and $I_{RTN}$ is the DC/DC converter output current returned to the module. With no loading or charging of the entire battery stack ($I_{STK}=0$), $I_{MOD,m}$ equals $I_{RTN,m}$. Once all impedances are calculated, the following Equation 3 may be used for correcting VCELL while balancers are operating:

$$V_{n,A}=V_{n,B}+I_n\cdot(R_{n-1,A}+R_{n,B})-I_{n-1}\cdot R_{n-1,B}-I_{n+1}\cdot R_{n,A}+ (I_n-I_{MOD})\cdot R_{n,CELL} \quad \text{(Equation 3)},$$

where $V_{n,A}$ is the actual cell voltage associated with a cell n and $V_{n,B}$ is the measured cell voltage in MODE1. $R_{n-1,A}$ and $R_{n-1,B}$ are resistances associated with a line connecting a ground terminal of the monitoring device with a negative terminal of the cell n. $R_{n,A}$ and $R_{n,B}$ are resistances associated with a line connecting a Vcell pin of the monitoring circuit with a plus terminal of the cell n. $R_{n,CELL}$ is a resistance accounting for all impedances not having a shared path with a cell below and a cell above the cell n. $I_n$ is a balancing current associated with the cell n. $I_{n-1}$ is a balancing current associated with the cell below the cell n. $I_{n+1}$ is a balancing current associated with the cell above the cell n. $I_{MOD}$ is the current simultaneously flowing through the plurality of cells. $R_{n-1,A}$, $R_{n-1,B}$, $R_{n,A}$ and $R_{n,B}$ may be calculated using formulas shown in equation 2. $I_n$ may be measured from a particular cell using the integrated monitoring device. $I_{MON}$ is the module current measured using circuit 140 and 142 in FIG. 1.

The three-impedance method should not affect the acquisition time since all 12 channels are converted during each stack measurement; however, additional time will be required to calculate the new impedances using a processor. Finally, the impedance reported by the system should be the average of the two measured impedances.

With this approach, the IR drop due to balancing may be calculated and can be taken into account in calculating the actual voltage. Therefore, the monitoring integrated circuit does not need to be turned off to read the voltage and the balancing time may be maximized. Furthermore, with this approach the possibility of damaging the cell may be reduced since the visibility with the stack may not be lost during balancing and more energy may be safely recovered from the battery stack.

Figure 8:
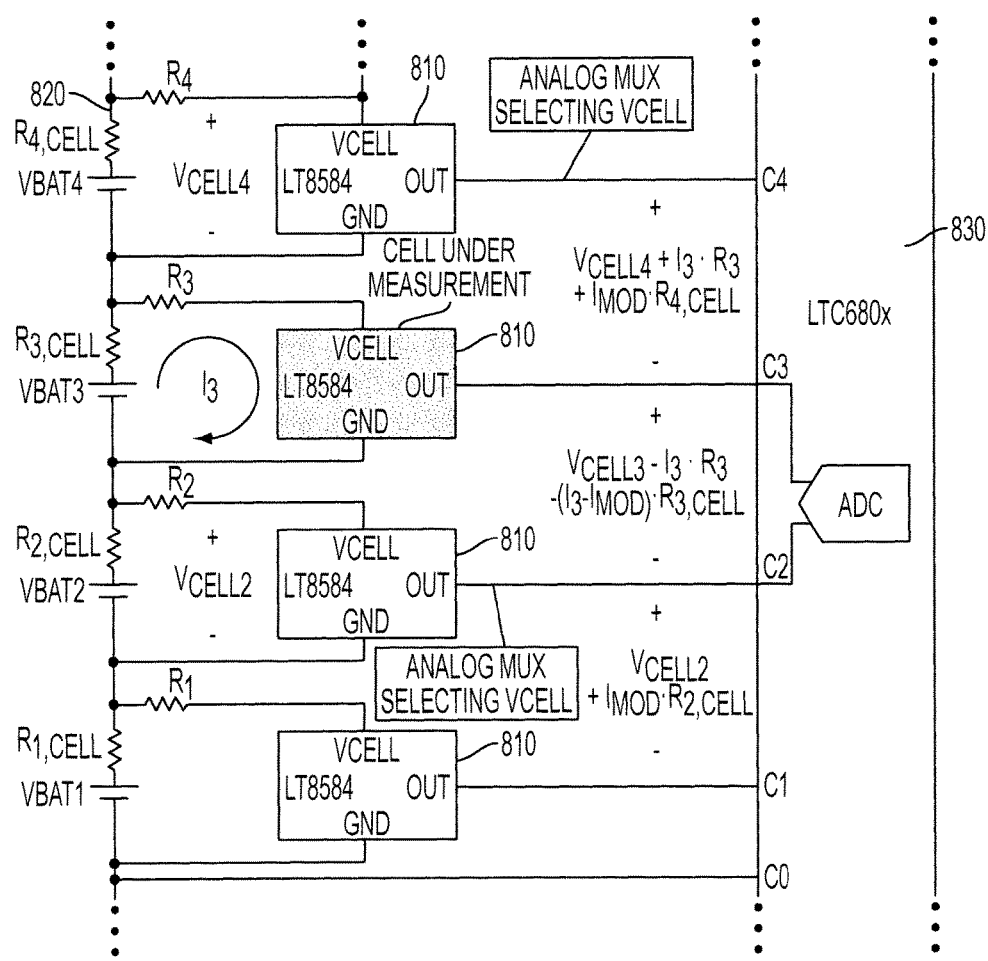
FIG. 8 illustrates a graphical representation of calculating channel impedances of the monitoring integrated circuit having the two-wire configuration.

FIG. 8 illustrates a graphical representation of calculating channel impedances of the monitoring integrated circuit having the two-wire configuration. The two-wire configuration includes a monitoring integrated circuit 810, a battery stack 820, and a BSM 830, which are similar to the monitoring integrated circuit 110, the battery stack 120, and the BSM 130 and therefore their redundant aspect are not described here in more detail. The monitoring integrated circuit 810, however, has a two-wire configuration connection to the battery stack instead of the single-wire configuration described with respect to FIG. 1. The algorithm for IR correction in 2-wire battery connection configuration is more straightforward since each channel is isolated from its adjacent channels and does not share a common connection to the battery stack. The voltage measurement of a given channel does depend on the channel directly below it. FIG. 8 shows the measurement of each channels positive cell connection (note that the ground connection resistance for each channel cannot be measured in 2-wire configuration). The following equation is used to calculate each positive channel connection resistance, using either method in FIG. 5:

$$R_n = \frac{V_{n,MODE0} - V_{n,MODE1} - (I_n - I_{MOD})\cdot R_{n,CELL}}{I_n}, \quad \text{(Equation 4)}$$

The channel under measurement may have its adjacent channel below selecting VCELL in MODE0. The channel below is the negative reference for measuring balancing current. The general equation for calculating floating voltage or open cell voltage takes into account the modulation due to the channel below the one being measured:

$$V_{n,A}=V_{n,B}+I_n\cdot R_n+(I_n-I_{MOD})\cdot R_{n,CELL}-I_{n-1}\cdot R_{n-1} \quad \text{(Equation 5)},$$

where $V_{n,A}$ is the open cell voltage or float voltage of a particular cell n, measured in MODE0 (balancing disabled). $V_{n,B}$ is the cell voltage measured in MODE1 (balancing enabled) of a particular cell n. $I_n\cdot R_{n-1}$ is the IR drop due to the cell below the one under measurement. The $R_{n,CELL}$ term accounts for the DCR and connection between batteries affected by the module current, $I_{MOD}$, and the balancing current, $I_n$. The Equivalent Series Resistance (ESR) of the battery can be extracted using the ESR test circuit. The ESR of most batteries is quite low, usually in the single digit milliohm range. The battery connection impedance measurement may also include this battery ESR parameter.

Figure 9:
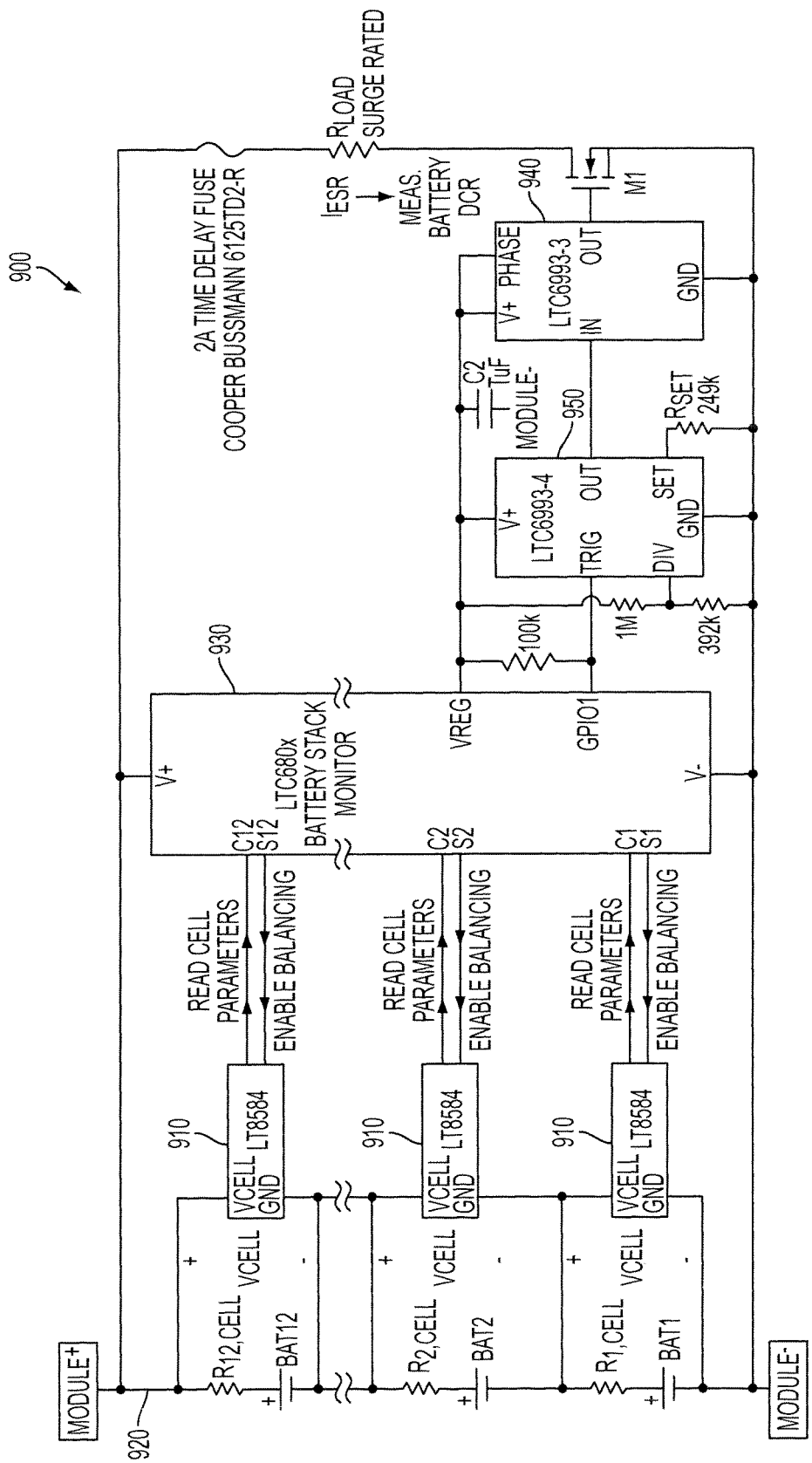
FIG. 9 illustrates an exemplary circuit for measuring ESR of the battery stack.

FIG. 9 illustrates an exemplary circuit 900 for measuring $R_{n,CELL}$ of the battery stack. The circuit 900 includes monitoring integrated circuits 910, battery stack 920, a BSM 930, one shot circuits 940 and 950, a load resistor Rload, and a MOSFET M1. The monitoring integrated circuits 910, the battery stack 920, and the BSM 930 are similar to the monitoring integrated circuit 110, the battery stack 120, and the BSM 130 described with respect to FIG. 1. Therefore, their redundant aspects are not described in more detail. The BSM 930 may include several GPIO channels (e.g., the GPIO1) that can be used to extract a known current from the top and bottom of the battery stack 920 for the purpose of measuring battery $R_{n,CELL}$. The GPIO1 can also be used to toggle input of the one shot circuit 950, which in turn drives the one shot circuit 940, which is a gate driver driving the gate of MOSFET M1, keeping it on.

The Rload at one end is connected to the positive terminal of the battery stack 920 and at another end is connected to MOSFET M1. The MOSFET M1 at one end is connected to the Rload and at the other end is connected to the negative terminal of the battery stack 920. The gate of the MOSFET M1 is connected to the output pin of the gate driver circuit 940. The gate driver circuit 940 is connected at its input pin to the output pin of the one shot circuit 950. The one shot circuit 950 is connected at its input pin to the GPIO1 of the BSM 930. The V+ module of each of circuits 940 and 950 is connected to the regulated voltage output of the BSM 930. The ground modules of each of circuits 940 and 950 are connected to the negative terminal of the battery stack 920 along with V− of the BSM 930.

The one shot circuit 950 may be programmable one shot using three external resistors. The reason for putting this in the circuit 900 may be for safety in case of malfunction to avoid keeping MOSFET M1 on at all times. This would result in a large current, damaging the MOSFET M1. The one shot circuit 950 is added as a hardware safety that in one implementation only allows MOSFET M1 to turn on for a threshold amount of time. The threshold amount of time may be between 0.5 milliseconds to 100 milliseconds. If there is a software malfunction, no toggling may be seen on the input of the gate driver circuit 950 (e.g., output GPIO1 of the BSM 930). For accuracy, a large current (small value resistance for $R_{LOAD}$) for short duration may be used. The current may be on the order of 10 A, but dependent and proportional to the capacity of the batteries being utilized. The following equation may be used to determine $R_{n,CELL}$ or DCR for each battery in the stack:

$$R_{n,CELL} = R_{LOAD} \cdot \left( \frac{V_{CELL(OFF)} - V_{CELL(ON)}}{V_{MODULE}} \right), \quad \text{(Equation 6)}$$

where $VCELL_{(OFF)}$ is the monitoring integrated circuit in MODE0 with M1 off, $VCELL_{(ON)}$ is MODE0 with M1 on, and $V_{MODULE}$ is MODULE+ minus MODULE−. $R_{n,CELL}$ is used in equation 3, 4, and 5. The method in FIG. 9. may be used in place of the method described with respect to FIGS. 7A-7D to calculate equation for cell resistance. Parameter algorithm in FIG. 5A may be used to solve equations for resistance set A and resistance set B, reducing acquisition time by approximately a third. In addition to measuring the DCR of each cell, the one-shot circuit may be set to a short duration and triggered periodically at a rate of 1 kHz to 10 kHz. This allows measurement of the ESR or AC resistance of the cell. The equivalent $R_{LOAD}$ becomes the ratio of M1's on-time to M1's off-time multiplied by the magnitude of $R_{LOAD}$.

Calculating the $R_{n,CELL}$ or DCR may be helpful in determining whether the battery stack 920 is going bad or the contact resistance is going bad. When the battery stack 920 is charged and discharged a number of times, the contact resistance for the battery stack 920 may increase. By calculating the DCR, the customer can determine whether the faulty measurement is associated with a faulty battery stack 920 or faulty contacts. If the calculated DCR is higher than a threshold amount, the battery stack 920 is deemed faulty. If, however, the calculated DCR is lower than a threshold amount, the battery stack 920 is deemed okay and the problem may likely be associated with the faulty contacts resulted from continuous charging and discharging of the battery stack 920.

In one specific example, the resistor for $R_{LOAD}$ may be pulse rated to handle the large, short duration 10A pulse. For a 12-cell module, a good choice for $R_{LOAD}$ may be 6 paralleled 24Ω CRM series resistors. For MOSFET M1, Fairchild FDMC86102L or equivalent may be used. For the one-shot circuit 950 a LTC6993-4, or equivalent monostable pulse generator, to limit the pulse duration of MOSFET M1 to 20 ms may be used. The LTC1693-3 (940), a 1.5 A single-channel gate driver, is used to provide adequate turn-off and turn-on times for MOSFET M1, and can be substituted with any equivalent gate driver. The capacitance C2 is a bypass capacitor for filtering the power input pin to the two one shot circuits 940 and 950. The power input pin is driven by a 5 volt regulated voltage output from the BSM 930.

In a plurality of modules system, there may be a need to balance modules with respect to each other. Each module may correspond to a battery stack 920 including a plurality of cells. Each cell may be connected to a monitoring integrated circuit 910. The monitoring integrated circuit 910 may be connected to the BSM 930. In each module, the energy may be taken from one of the cells and it may be distributed to all 12 cells in the battery stack 920 to balance the modules within an acceptable threshold. Alternatively or additionally, the energy may be taken from 11 cells and may be distributed to all 12 cells in the battery stack 920 to balance one of the cells in the battery stack 920. This provides for balanced cells within a module. Even though module may be balanced, however, there may be some voltage differences between the balanced modules. To balance the modules with respect to each other in a system that has a plurality of modules such as, for example, a car which may have 10 modules each having 12 battery cells, the circuit 900 may be used. The Rload in one module may be turned on to reduce the voltage in the module until it reaches an acceptable threshold level with respect to the second module. During this processing, the monitoring integrated circuits 910 in the module may be turned off and the MOSFET M1 may be turned on and off. This process may avoid or reduce the mismatching between the modules and prevent one module to dictate the capacity of the entire 10 modules battery system.

In keeping with the previous example, assume the car is taken for service and it is determined that module 5 in the 10 modules battery system is defective. The module 5 may therefore be replaced with a new module. The new module may naturally have higher capacity than the remaining modules in the battery system. If the module 5 dictates the remaining capacity of the rest of the modules, then there is a risk of overcharging some of the other modules which have lower capacity. Therefore, the circuit 900 may be used to bleed out energy from the remaining modules until module 5 is fully charged.

In a single-wire configuration, an open connection affects the measurement of the two cells that share that connection. With no load on either affected channel, the voltage may reside roughly at the midpoint between the summation of the two cell voltages. The exact value may be a ratio among the $V_{IN}$ capacitor leakages and may vary significantly. An open connection may be detected by measuring the Vcell before and after turning on the balancer of a specific cell.

Figure 10A:
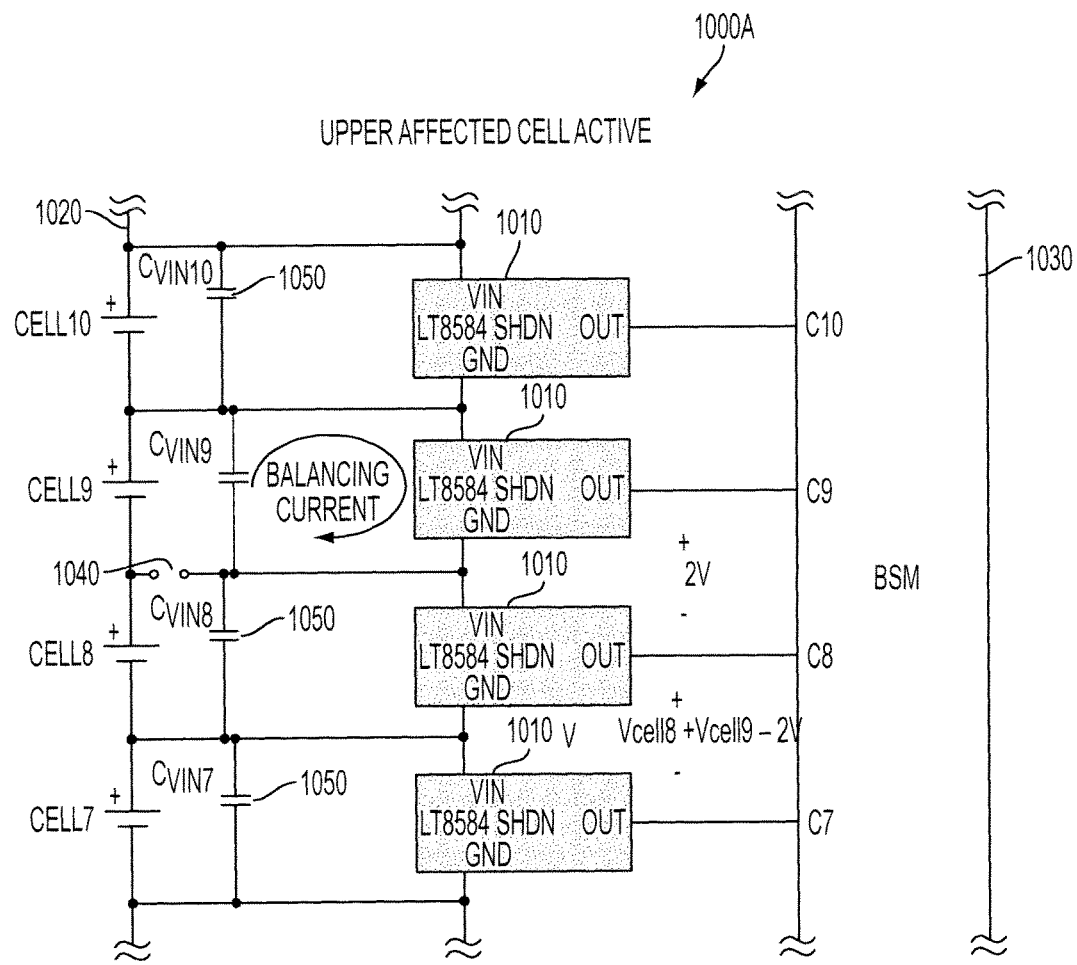
FIGS. 10A and 10B respectively illustrate the results of turning on a cell above an open connection in a single-wire configuration circuit and a cell below the open connection in a single-wire configuration circuit.
Figure 10B:
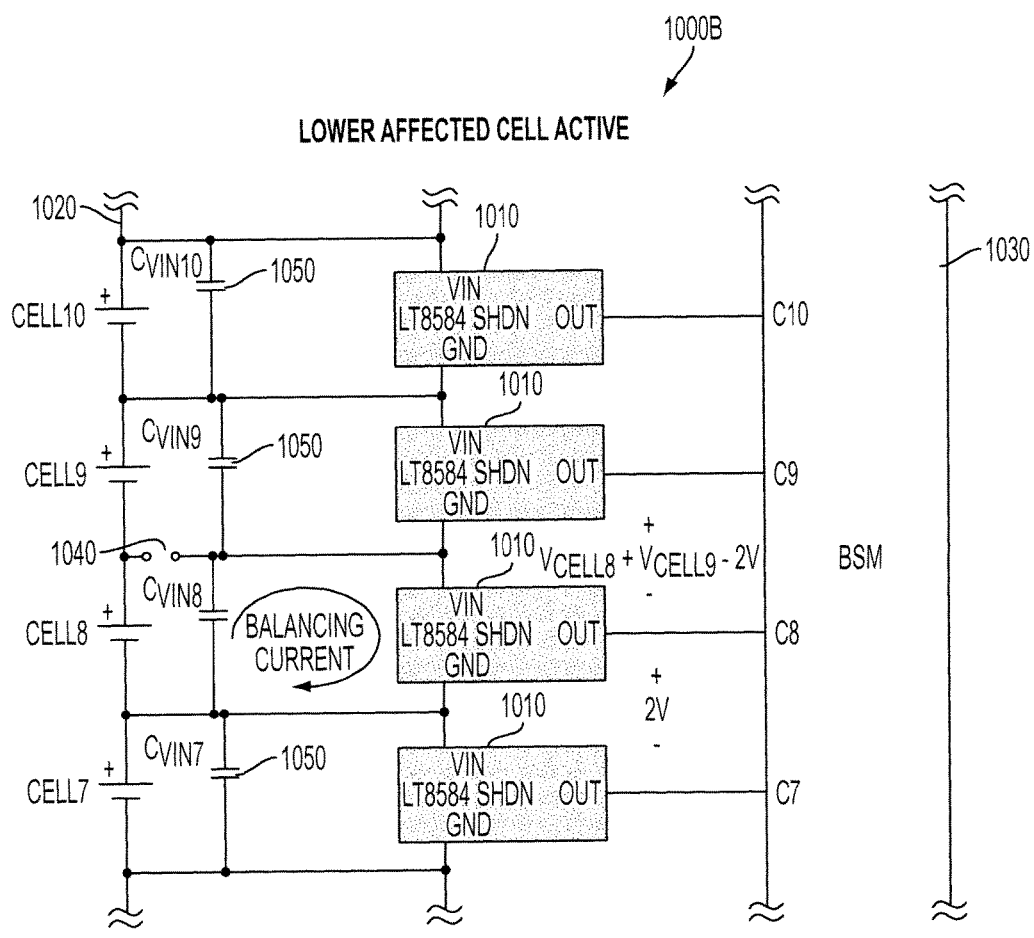

FIGS. 10A and 10B respectively illustrate the results of turning on the cell above the open connection in a single-wire configuration circuit 1000A and the cell below the open connection in the single-wire configuration circuit 1000B. The circuits 1000A and 1000B are similar and include the same components including the monitoring integrated circuit 1010, the battery stack 1020, and the BSM 1030. The monitoring integrated circuit 1010, the battery stack 1020, and the BSM 1030 are similar to the monitoring integrated circuit 110, the battery stack 120, and the BSM 130 described with respect to FIG. 1 and therefore they are not described in more detail. The difference between circuits 1000A and 1000B is that in circuit 1000A, the monitoring integrated circuit 1010 for the cell above an open connection 1040 is turned on and in circuit 1000B, the monitoring integrated circuit 1010 for the cell below the open connection 1040 is turned on for measuring voltages to determine the presence or absence of an open connection.

In this example, the open connection 1040 is between the positive terminal of battery cell 8 and the ground of monitoring integrated circuit 1010 of cell 9 or the Vin of the monitoring integrated circuit 1010 of cell 8. Both affected cells 8 and 9 respectively below and above the open connection 1040 should be tested to guarantee a particular connection has failed. The following algorithm may be used to determine an open connection.

1.) Measure all cell voltages in MODE0
2.) Turn on the upper affected cell for at least 2 ms
3.) Turn off the upper affected cell
4.) Measure all cell voltages in MODE0
5.) Turn on the lower affected cell for at least 2 ms
6.) Turn off the lower affected cell
7.) Measure all cell voltages in MODE0
8.) If step1-step4>200 mV and step4-step7>200 mV, there is an open The 200 mV threshold is chosen to provide tolerance for measurement error. The determination of an open connection 1040 may be important for a lot of customers because it helps them to determine whether the incorrect readings by the BSM 1030 is associated with the faulty battery stack 1020 or with the faulty wiring that connects the battery stack 1020 to the BSM 1030. The determination of the open connection 1040 may be done with the help of capacitors 1050—maintains voltage when the associated monitoring integrated circuit switch is off—and a switch within the monitoring integrated circuit 1010. The capacitors 1050 are external components to the monitoring integrated circuit 1010 and are by-pass capacitors for the switching converter in the monitoring integrated circuit 1010.

In normal operation, each cell would read Vcell. Once there is an open connection, however, the monitoring integrated circuit 1010 in the upper affected cell attempts to discharge the capacitor 1050, which is charged to the cell voltage (e.g., Vcell). Once the voltage reaches the 2 volts—close to the under-voltage threshold of the monitor IC—in one example, the monitoring integrated circuit 1010 detects that voltage is too low, stops discharging the capacitor 1050, and outputs the 2 volts once in the shutdown mode. This reading could provide one indication that there is an open connection in the circuit 1000A. This is because the absolute minimum battery voltage on any lithium ion cell is 2.5 volts. To this end and under normal circumstances, the output voltage of the monitoring integrated circuit 1010 should not be below 2.5 volts. In this case, however, due to the open connection 1040 the output voltage of the monitoring integrated circuit 1010 for upper cell 9 is 2 volts. The voltage output of the monitoring integrated circuit 1010 of the lower cell 8 in circuit 1000A in which the monitoring integrated circuit would be $Vcell_8+Vcell_9-2$ volts, which is higher than the actual Vcell.

Similarly, when the monitoring integrated circuit 1010 of lower cell 8 is turned on and the monitoring integrated circuit 1010 of the upper cell 9 is turned off, the measured voltage of cell 8 is about 2 volts and the measured voltage of cell 9 is about $Vcell_8+Vcell_9-2$. These reading could provide one indication that there is an open connection in the circuits 1000A and 1000B.

For a two-wire system, the connection between adjacent $C_{VIN}$ capacitors is broken when a connection goes open. The $V_{VIN}$ will most likely be below a diode for that particular channel, and the OUT pin will be high impedance. A two-wire configuration requires the method described in the LTC680x datasheet for open connection detection. This method uses 100 uA current sources to drive the C pins. Note that the single-wire connection requires the LTC680x open connection detection scheme to detect an open between the monitoring integrated circuit output and its C-pins.

In addition to an open connection detection in an active balancing circuit, an open cell may also exist. An open cell may only affect the particular channel having the open cell. The measured voltage across the open cell depends on the direction of current in the battery stack. If the battery stack is supplying a load, then the voltage will be clamped to a negative forward voltage of a diode, either the external TVS diode (recommended for Hot-swapping or hot-plugging protection) or the internal substrate diode of the monitoring integrated circuit VCELL or VIN pin. Likewise, if the battery stack is being charged, the open cell voltage will be clamped to the Zener voltage of the TVS diode which is set greater than the maximum cell voltage.

Figures 11A, 11B:
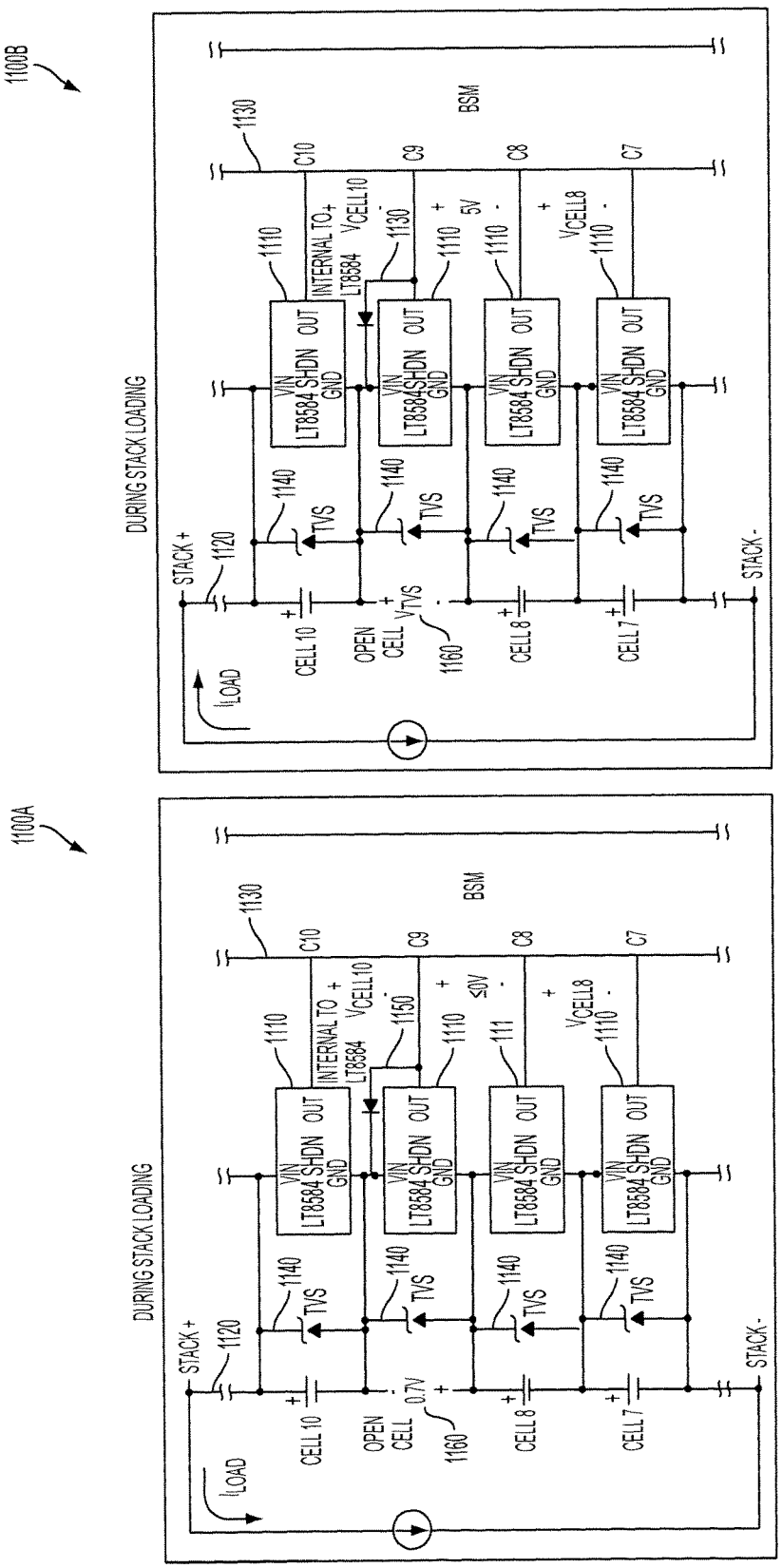
FIGS. 11A and 11B respectively illustrate applying a load or charge to the battery stack in order to detect an open or missing cell.

FIGS. 11A and 11B illustrate the effect of an open cell on channel 9 with either the stack being loaded or charged. Specifically, FIG. 11A illustrates the effect of an open cell on channel 9 with the battery stack supplying a load. FIG. 11B illustrates the effect of an open cell on channel 9 with the batter stack being charged. The circuits 1100A and 1100B include the same components including the monitoring integrated circuit 1110, the battery stack 1120, the BSM 1130, external diode 1140, and the internal diode 1150. In circuit 1100A, however, the battery stack 1120 is being discharged and in the circuit 1100B the battery stack 1120 is being charged. The circuits 1100A and 1100B also include an open cell 1160 in their channel 9.

The measured voltage across the open cell 1160 depends on the direction of current in the battery stack 1120. If the battery stack 1120 is supplying a load as shown in FIG. 11A, then the voltage will be clamped to a negative forward voltage of a diode. The diode may include either the external TVS diode 1140 (recommended for Hot-swapping or hot-plugging protection) or the internal substrate diode 1150 of the monitoring integrated circuit 1110 Vcell or Vin pin. Likewise, if the battery stack 1120 is being charged, the open cell voltage may be clamped to the Zener voltage of the TVS diode 1140, which may be set greater than the maximum cell voltage.

The open cell can also be tested without a load placed across the entire series stack of battery cells 1120. The charging current may be the current source from other channels within the 12-cell module, having their respective discharger enabled. The passive/active module-to-module discharger or the battery ESR pulse circuit may be used to discharge the module containing the open cell.

Two sequential measurements are required to extract most parameters from the monitoring integrated circuit like that in FIG. 4. This measurement method may be prone to error when the load is switched on between sequential reads. The error maybe mitigated by detecting and correcting for a common-mode shift introduced by the load current.

$$V_{PAR} = 1^{st} \text{ Measurement} - (2^{nd} \text{ Measurement}) \quad \text{(Equation 7)}$$
$$= VCELL - (VCELL - V'_{PAR} + V_{CM})$$
$$= V'_{PAR} - V_{CM},$$

where $V_{PAR}$ is desired measured parameter and $V_{CM}$ is the common-mode shift. The best accuracy results from using channels measured at the same point in time.

Figure 11C:
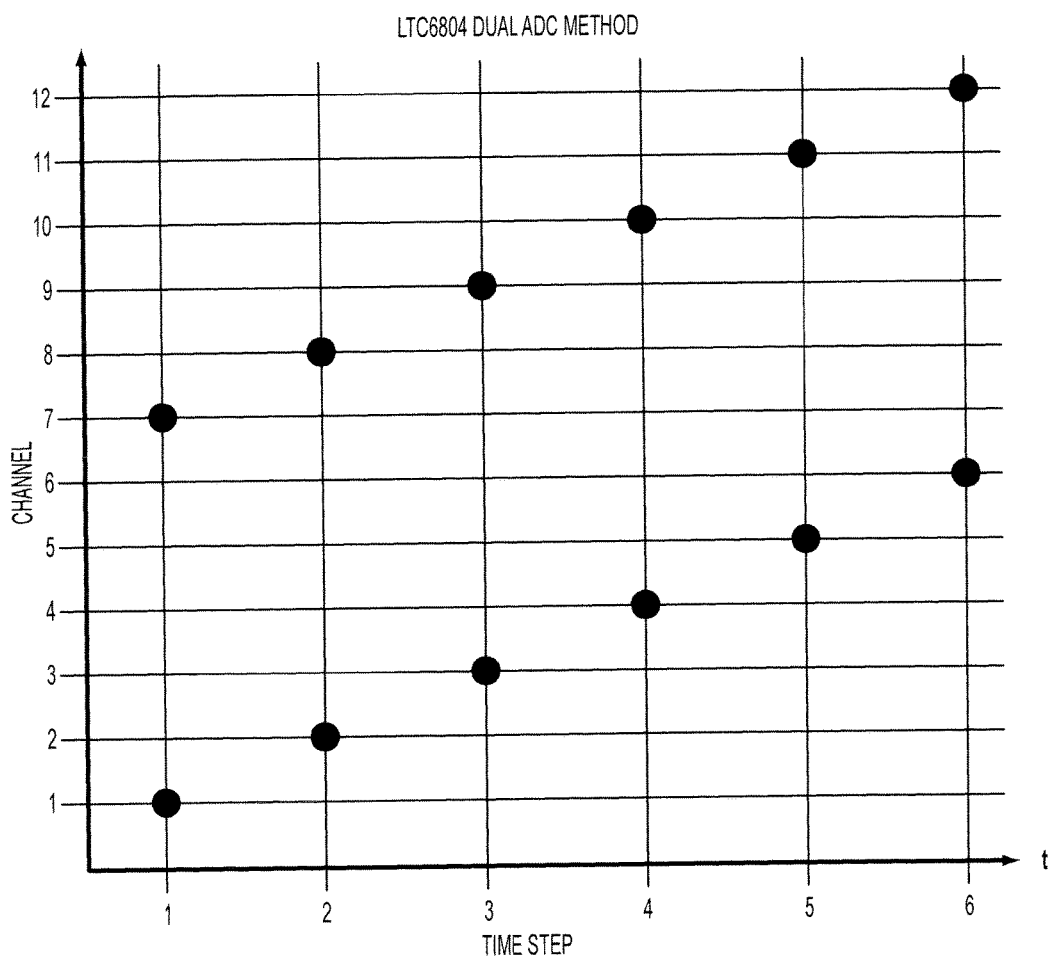
FIG. 11C illustrates the advantage of multi-ADC architecture for common-mode correction.

FIG. 11C illustrates that a BSM IC may contain several ADC channels clocked by the same system clock, measuring multiple channels simultaneously. Other channels in a full-stack read are acquired during a different time step. Comparing the common-mode voltage of channels acquired during a different time step may result in a large error. Thus, the common-mode information must be applied to channels taken during the same time step. The extraction algorithm shown in FIG. 5A works well with a two channel BSM ADC architecture, such that common-mode information may be extracted on one ADC while the second ADC extracts a commanded cell parameter. $V_{CM}$ may be calculated by comparing the Vcell measurements in stack 1 during the first measurement with the Vcell measurements in the stack 1 during the second measurement and identifying the difference as the $V_{CM}$.

When the battery stack is connected with the BMS board, a surge current may be generated as a result of capacitances in the BMS. Due to wire and routing inductance in the path of the surge current, a subsequent surge voltage may exceed the maximum input voltage of the BSM and therefore damage the BSM. Specifically, large currents are developed when hotswapping a battery with an analog BSM application due to the large input bulk capacitance coupled with the low ESR of the batteries. In the case of the monitoring integrated circuit implementation, the monitoring integrated circuit may have no problem handling the overshoot voltage that follows the large inrush current. The downstream BSM, however, may encounter damage that requires additional steps and/or circuitry to protect against hotswapping. There are several ways to protect against hotswapping the battery stack into the BMS board. Specifically, there is a mechanical solution and there is an active solution.

Figure 12:
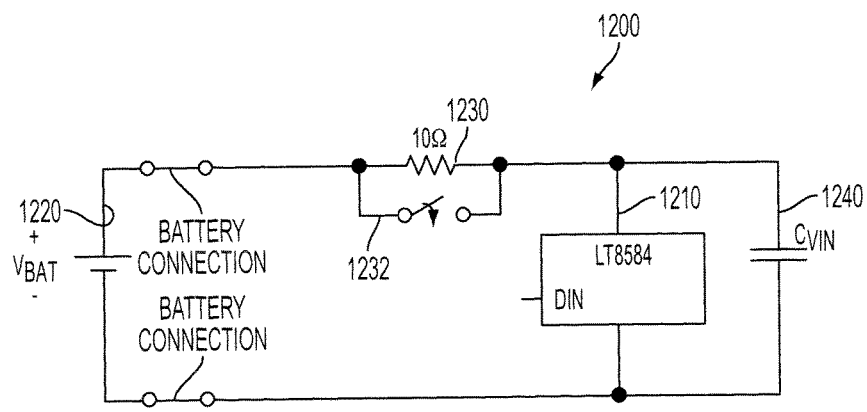
FIG. 12 illustrates an exemplary hotswapping protection circuit providing a mechanical solution for protecting against hotswapping the battery stack into a Battery Management System (BMS) board.

FIG. 12 illustrates an exemplary hotswapping protection circuit 1200 providing a mechanical solution for protecting against hotswapping the battery stack into the BMS board. A mechanical approach may result in the most cost effective solution. The circuit 1200 includes a monitoring integrated circuit 1210, a battery cell 1220, a resistor 1230, and a capacitor 1240. The resistor 1230 may be a 10Ω resistor used to pre-charge the $C_{VIN}$ capacitor 1240 to the battery voltage, limiting the inrush current. In the absence of resistor 1230, the only resistance may include the interconnect resistance which may lead to a large inrush current into the input of the BSM, damaging the BSM. After the $C_{VIN}$ capacitor 1240 is charged, a mechanical switch 1232 is connected across the resistor 1230 and remains there during all normal operations. There are three recommended solutions for the mechanical short 1232: 1) use a >3 A rated jumper 2) use a mechanical switch or 3) use a staggered-pin battery connector. The staggered pin connection has the long pins connecting to the monitoring integrated circuit 1210 through the 10Ω resistor 1230 to charge up the capacitor 1240. The short pins connect directly to the monitoring integrated circuit 1210, shorting out the 10Ω resistor 1230. Normal insertion has a delay on the order of milliseconds between the long pin connecting and short pin connecting to the circuit, allowing $C_{VIN}$ 1240 to charge up before the mechanical short is made.

FIGS. 13A and 13B illustrate two exemplary hotswapping protection circuits 1300A and 1300B each providing an active solution for protecting against hotswapping the battery stack into the BMS board. An active solution may have the added advantage of automatic hotswapping protection (e.g., no additional steps are needed when connecting batteries). FIG. 13A illustrates an exemplary hotswapping protection circuit 1300A including a monitoring integrated circuit 1310, a battery stack 1320, a resistor 1330, and a capacitor 1340. The hotswapping protection circuit 1300A is similar to the hotswapping protection circuit 1200 except in the hotswapping protection circuit 1300A, the mechanical switch 1232 is replaced with the MOSFET M1 1332, which can automatically turn on using the capacitor 1334 and the resistor 1336 to short the resistor 1330. When the battery stack 1320 is first connected to each channel, the capacitor 1334 is discharged or shorted, therefore MOSFET M1 1332 is off. This means that all current will travel through the resistor 1330 to charge the capacitor 1340. Immediately after hotswapping the battery stack 1320, the resistor 1336 starts charging the capacitor 1334, and after some delay, turns on the MOSFET M1 1332, which will short the resistor 1330. The resistor 1330 may remain shorted during the remaining of the normal operation of the BMS. The circuit 1300A also has additional over-voltage protection via a fuse, F1 and diode 1338. The diode 1338 may be a zener diode and is described in more detail with respect to FIG. 13B. The circuit 1300A may have the disadvantage of lower efficiency and higher cost. In one specific example, the MOSFET M1 1332 has a low $R_{DS,ON}$ to maximize converter efficiency and has less than a 1.25V $V_{GS}$ threshold. The capacitor 1336 has a size such that the time delay of M1 turning on is greater than the time to significantly charge capacitor 1340.

FIG. 13B illustrates an exemplary hotswapping protection circuit 1300B including a monitoring integrated circuit 1310, a battery stack 1320, a capacitor 1350, and diodes 1360 and 1370. Instead of the resistor 1320 in the circuit 1300A, the circuit 1300B includes diodes 1360 and 1370. The diodes 1360 and 1370 may be transient voltage suppressor, which may be low-impedance zener diodes. The zener diodes typically can handle hundreds of amps and still be very close to their zener voltage. The zener voltage may be picked to be lesser than the maximum voltage allowed for the monitoring integrated circuit 1310 and BSM circuit. In one specific example, the zener voltage of the diode 1360 may be 6.8 volt. The diode 1360 may absorb all the rushed current so that the voltage provided to the monitoring integrated circuit 1310 does not go much higher than 6.8 volts. The diode 1370 provides a second layer of protection to input of the BSM.

The implementation of the proposed float voltage compensation may vary depending upon the communication architecture and construction and combination of the current sense amplifier and battery voltage sense circuitry. This does not invalidate the proposed method to compensate for all IR drops in the system and to accurately calculate the battery float voltage during battery balancing. The algorithm accounts for the small inaccuracies in the current sense amplifier by measuring each wire/connector impedance twice using each adjacent current sense amplifier and balancing path, the one above and the one below the impedance being measured. It is conceivable that if there where no significant errors in the current sense amplifier that the measurement of each wire/connector could be performed using only one adjacent current sense amplifier and balancing path, either the set above or below the wire/connector under measurement.

Some of the features of the BMS include one wire communication of the monitoring integrated circuit, making it possible for measuring accurate voltage drop and capability to measure balancing current while balancing very accurately using LTC6804. Other attempts may be much more complicated and less accurate (for example turn off the balancer to measure voltage which will cause error due to the battery voltage fluctuations before settling back to float voltage). Furthermore, unique algorithm and methodology may be used for calculating series resistances in the balancing path, utilizing the analog multiplexer of the monitoring integrated circuit. Furthermore, unique firmware algorithm may be used to perform IR drop compensation, common-mode compensation, and voltage droop compensation (float voltage compensation) in rapid duration for faster logging of the cell voltages. Higher resolution on balancing threshold range is made possible by very accurate balancing current measurements using an internally trimmed current sense amplifier. Additional safety features for BMS system design include reference redundancy on different ICs using the handshake voltage of the monitoring integrated circuit to verify that each channel of the BSM is operating properly, open circuit detection, converter switch protection, and battery stack common-mode correction.

Other implementations are contemplated. For example, the system may include switch protection for each channels switch-mode converter. Referring again to FIG. 2, several protection features may be included to prevent the internal power switch of the monitoring integrated circuit 210 from sustaining permanent damage: a short-circuit detector, a high-impedance detector, and switch overvoltage protection (OVP). These may also alert the user when the integrity of the discharge converter has been compromised because of a fault. Switching may be disabled during fault conditions. The short-circuit detector may detect when the power switch turns off prematurely due to a short in the primary-side winding of the transformer. If the current comparator trips before the 550 ns short detection timeout, the switch error latch will trip. The output pin 212 is driven to Vin−1.2V, VSW,ERR, during a switch error. The part may have to be reset to clear the switch error fault.

The high impedance detector may monitor how long the power switch of the monitoring integrated circuit 210 has been on. If the switch remains on longer than 50 μs, the switch maximum on-time, the switch error latch is set and the output pin 212 is driven to Vin−1.2V, VSW,ERR. The part may have to be reset to clear the switch error fault. The OVP circuit may dynamically clamp the NPN collector's SW pins to 50V. This protects the internal power switch from entering breakdown and causing permanent damage. The clamp may also be used as a primary-side snubber to absorb the leakage inductance energy. The 200 ns switch clamp blanking time determines if the clamp is absorbing a leakage spike or if the switch is turning off while the secondary of the transformer is open. If the switch clamp is on longer than approximately 200 ns, the switch error latch is set. The part may have to be reset to clear the switch error fault.

For another example, the monitoring integrated circuit may be designed to not house the switch, which is connected to the primary transformer winding. Instead, the switch may be housed outside of the monitoring integrated circuit. Placing the switch outside of the monitoring integrated circuit may enable the monitoring integrated circuit to handle larger current. To illustrate one specific example, the monitoring integrated circuit can handle an average current of up to 2.5 amps whereas LTC3300 can handle larger current up to 10 amps.

Figure 14:
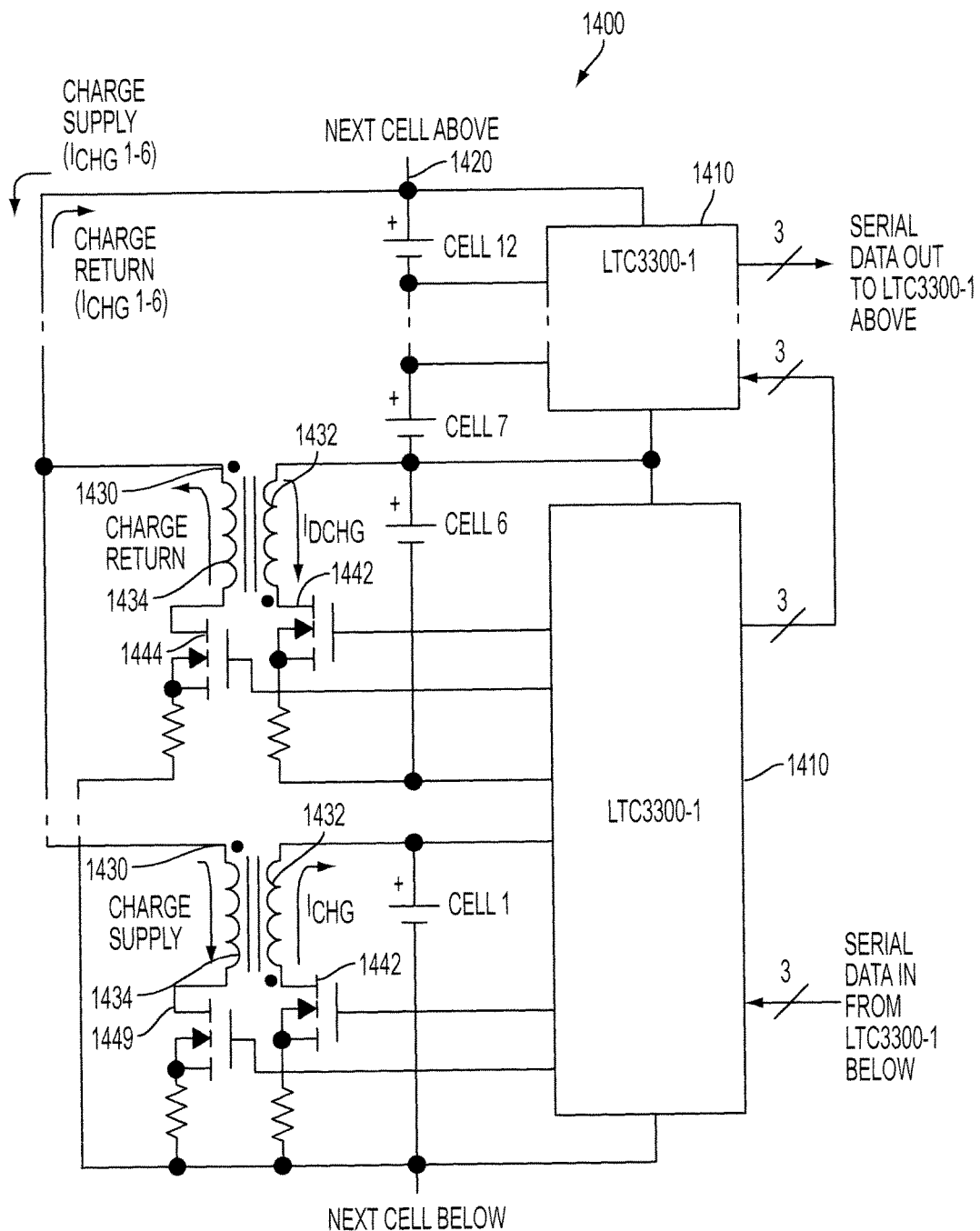
FIG. 14 illustrates an exemplary circuit in which a switch connecting a monitoring circuit to a transformer is placed outside of the monitoring circuit.

FIG. 14 illustrates an exemplary circuit 1400 in which a switch connecting a monitoring circuit to a transformer is placed outside of the monitoring circuit. The circuit 1400 includes a monitoring integrated circuit 1410, a battery stack 1420, transformers 1430, a plurality of first switches 1442, and a plurality of second switches 1444. The monitoring integrated circuit 1410 includes LTC3300. In each channel, the monitoring integrated circuit 1410 is connected to a cell within the battery stack 1420 via transformer 1430. The transformer 1430 includes a primary winding 1432 and a second winding 1434. The primary winding 1432 at one end is connected to the plus side of the cell in the battery stack 1420 and at another side is connected to the drain of the first switch 1442. The switch 1442 at its gate is connected to the monitoring integrated circuit 1410 and at its source is connected to the negative terminal of a cell in battery stack 1420 through a resistor. The secondary winding 1434 at one end is connected to the positive terminal of the battery stack 1420 and at the other end is connected to the drain of the second switch 1444. The gate of the second switch 1444 is connected to the monitoring integrated circuit 1410 and the source of the second switch 1444 is connected to the negative terminal of the battery stack 1420 through a resistor.

Figure 15A:
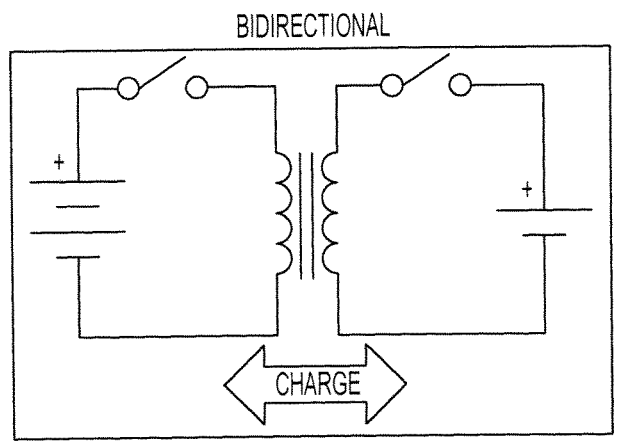
FIG. 15A illustrates a bidirectional transfer of energy enabled by the monitoring integrated circuit shown in FIG. 14.
Figure 15B:
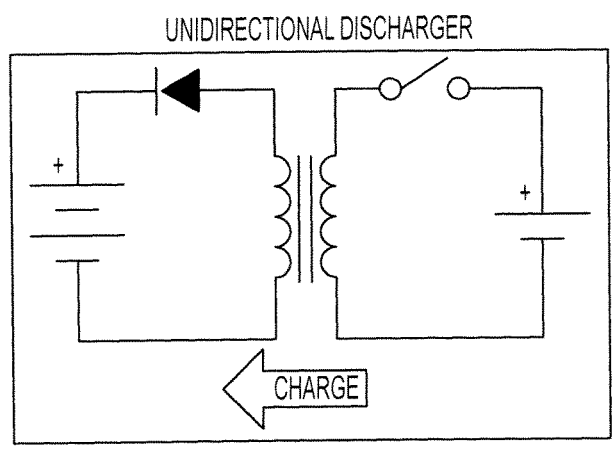
FIG. 15B illustrates unidirectional transfer of energy enabled by the monitoring integrated circuit shown in FIG. 1.
Figure 15C:
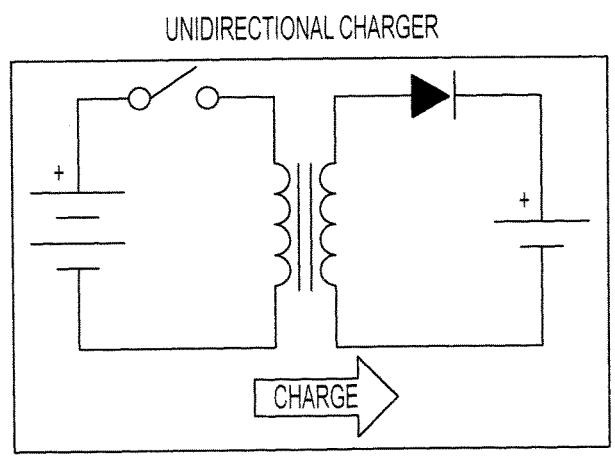
FIG. 15C illustrates unidirectional charger with the DC/DC converter switch residing on the battery stack side and the diode driving the individual cells.

The advantage of monitoring integrated circuit 1410 shown in FIG. 14 to the monitoring integrated circuit 210 shown in FIG. 2 is that the monitoring integrated circuit 1410 allows for bidirectional transfer of energy as shown in FIG. 15A whereas, the monitoring integrated circuit 210 may only allow for unidirectional transfer of energy as shown in FIG. 15B. For example, during discharging, the monitoring integrated circuit 210 for the specific cell with high energy in the battery stack 220 turns on, takes energy from the cell using its primary winding and returns the energy to the battery stack 220 using its secondary winding. During charging of the same cell, the monitoring integrated circuits 210 associated with other cells may turn on, may take energy from those cells using their primary windings and may return the energy to the battery stack 220 using their secondary windings. In contrast, during charging, the monitoring integrated circuit 1410 may charge the specific cell that needs to be charged and may not have to return the energy to the entire battery stack. That is, the monitoring integrated circuit 1410 can take the energy from the battery stack 1420 using its secondary winding and can return it to a specific cell that needs to be charged. FIG. 15C illustrates unidirectional charger with the DC/DC converter switch residing on the battery stack side and the diode driving the individual cells.

Voltage droop is a phenomenon due the chemical reaction within the particular cell. The chemical reaction within the particular cell necessary to generate the required voltage, results in a drop in the voltage at the terminals of the cell temporarily when the cell is turned on. When the cell is turned off, the cell voltage would climb back as the diffusion of ions in the cell equalize. Charge cannot be created instantaneously; and for a given amount of time, can only produce a finite amount. The battery cell also has some capacitive effects that allow short term instantaneous charge delivery. At some point, the charge generation rate required to maintain a certain voltage equals the charge extracted from the cell. Charge being externally removed from the cell during balancing can be seen as a net loss of charge, and thus, a drop in voltage. Note that the open cell voltage of the lithium-ion cell is an indication of State of Charge (SOC) of cell which may or may not equal the terminal voltage of the cell. Equation 8 illustrates this, where Capacity is the capacity of a particular cell in coulombs and $V_{RANGE}$ is the maximum allowable cell voltage minus the minimum allowable cell voltage.

$$\Delta V = V_{DROOP} = \left(\frac{\Delta Q}{\text{Capacity}}\right) \cdot V_{RANGE} \quad \text{(Equation 8)}$$

IR compensation may correct for all IR drops and may yield the voltage at the terminals of battery including the IR drop due to the resistance of terminals and internal interconnect structure. Due to the voltage droop phenomenon, the actual open-cell voltage is higher than the voltage at the terminals of the battery. Thus, without correcting for $V_{DROOP}$, IR compensation may not yield the true open cell voltage.

Figure 16A:
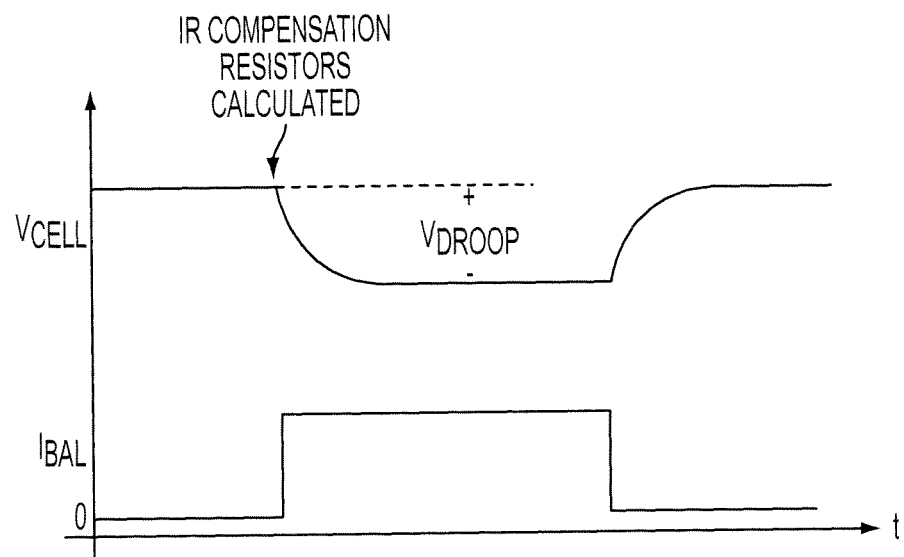
FIGS. 16A and 16B illustrate the effect of balancing on the battery terminals.
Figure 16B:
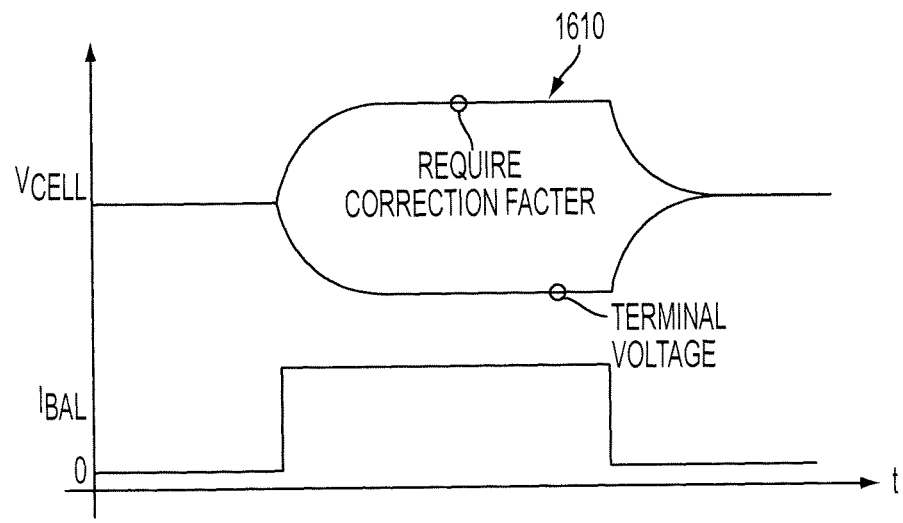

FIGS. 16A and 16B illustrate the effect of balancing on the battery terminals. FIG. 16A illustrates the voltage droop of the cell when the balancer is turned on. As noted above, this droop is temporary and due to the chemical reactions within the cell and will go away after the balancer is turned off. Therefore, without voltage droop correction, the balancing algorithm would oscillate as the cell voltage droops and recovers. This is because the measured cell voltage at the balancer is lower than the actual voltage of the cell due to the voltage droop. Note that the voltage droop may be typically on the order of 10 or 20 mV. FIG. 16B illustrates one method for correcting the voltage droop by continuously measuring the droop and correcting each point. This stabilizes the closed-loop balancing algorithm, effectively adding feed-forward compensation, and canceling the low-frequency poles associated with the cells' internal charge generation. To this end, the required correction factor 1610 is shown during the time the balancer is on. When the balancer turns off, the correction factor gradually disappears. However, the amount of processing power to correct every data point for voltage droop may become unfeasible (note that some battery stacks exceed 100 cells). Instead, a different approach is to track the rate of change in voltage with time.

Figure 17:
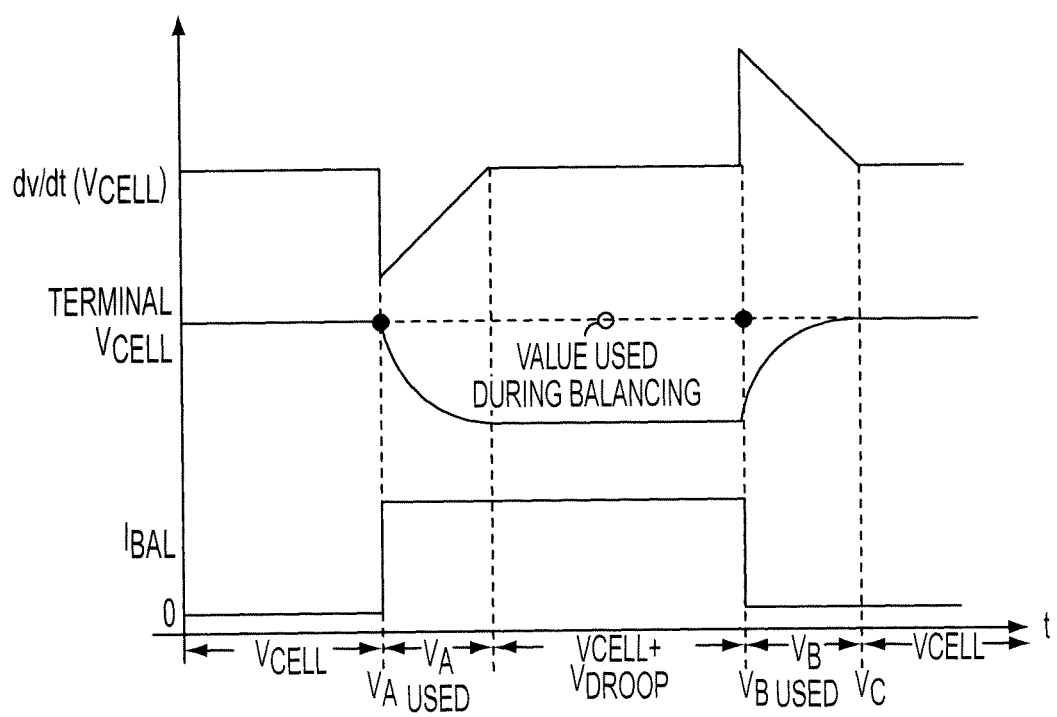
FIG. 17 illustrates the derivative approach to account for voltage droop.

FIG. 17 illustrates the derivative approach of the previous example for accounting for voltage droop. To remove the oscillation in the balancing algorithm, the amount of droop for a particular cell may have to be known. This requires that the cells be exercised at least once before the balancing algorithm is initiated, and the value stored for later use. $V_{DROOP}$ compensation in FIG. 17 assumes that negligible change in SOC takes place during the transient events which may take several minutes. The following algorithm is used during cell loading:

Initial Transient: $V_A$ (last measurement before transient) is used in the balancing algorithm until the time derivative of $V_{CELL}$ reaches a minimum threshold. The minimum threshold is used for determining when the terminal voltage has equalized and may be set to 1 or 2 mV between samples; however, it can be set to other numbers.

During loading: The typically $V_{DROOP}$ is added to the IR drop compensated, $V_{n,A}$, voltage and used in the balancing algorithm.

Exiting Transient: $V_B$ (last $V_{n,A}V_{DROOP}$ measurement) is used in the balancing algorithm until the time derivative of $V_{CELL}$ reaches a minimum threshold, perhaps 1 or 2 mV between samples.

After loading (balancer being turned off): Revert back to IR compensated $V_{CELL}$, $V_{n,A}$. Once the voltage droop is determined during the initialization period, since the voltage droop does not change significantly, the voltage droop may be used during any balancing without again calculating the voltage droop. Alternatively, for purposes of further accuracy, the voltage droop may be calculated from time to time until and the newly calculated voltage droop may be used in the balancing every thirty minutes, for example. Of course, if system dynamic changes, the voltage droop may be calculated at the time of the change and the newly calculated voltage droop may be used in balancing.

Recalculate Voltage Droop: Voltage droop may be recalculated using the points $V_B$ and $V_C$ in FIG. 17 using Equation 9. Finer resolution may be achieved by extending the time between cell voltage measurements and utilizing moving average techniques. The threshold time may be adjustable. In one specific example, the threshold time may be set every twenty milliseconds until the differential cell voltage is within the set threshold. Typically, within one or two minutes during which the droop is happening.

$$V_{DROOP} = V_C - V_B \qquad \text{(Equation 9)}$$

The magnitude of Voltage Droop increases with increasing current. A scale factor may be calculated and used to adjust the Voltage Droop compensation during different loading conditions. Equation 10 may produce a usable scale factor and assumes a linear relationship for Voltage Droop verse loading current. Curve fitting may also be used to scale the voltage droop bases on loading current, accounting for a nonlinear relationship and increasing the overall accuracy.

$$R_{n,ESR} = V_{n,DROOP}/I_n \qquad \text{(Equation 10)}$$

Voltage Droop Compensation may also increase system stability. In addition to Voltage Droop Compensation, a moving average may be implemented to reduce noise and system perturbations from inducing ringing in the balancing response. Ringing may cause excessive efficiency losses and reduced charge recovery. System stability may be required to extend run-time of the battery pack, and may prevent the balance among stored charge in the cells from diverging instead of converging.

Moving forward, several end market applications of series-stacked lithium ion battery packs may require that the battery be evenly distributed throughout the device. Other applications may require easy servicing of the battery pack. Both of these applications benefit from a modular based approach such that the battery pack is constructed using 12-cell, self contained modules. The choice of 12 cells works well with the 12-channel BSM IC, but the concept works with any number of cells per module. The module itself is constructed like that in FIG. 1 where the cell balancing is contained within the module. As shown in FIG. 1, the use of a unidirectional discharger configuration may be used. Alternatively, unidirectional or bidirectional charger configurations may be used. This may be much more efficient than passively balancing the modules and may allow much higher balancing currents. The charge for each cell is either taken from or returned to the entire 12-cell module, labeled MODULE+ and MODULE−.

The charge could be taken from or returned to the entire stack voltage comprised of several series-connected 12-cell modules, but high voltage would be present in the module and could pose a safety risk during maintenance. It also increases the risk when routing high-voltage lines in devices that have modules spread throughout for even weight distribution. In the case where individual cell balancing is contained to the module, a second stage of balancing may be required to balance charge among the plurality of modules that comprises the entire battery stack. This is especially apparent when a new module replaces a damaged one, having more capacity than all other modules in the battery stack.

Figure 18:
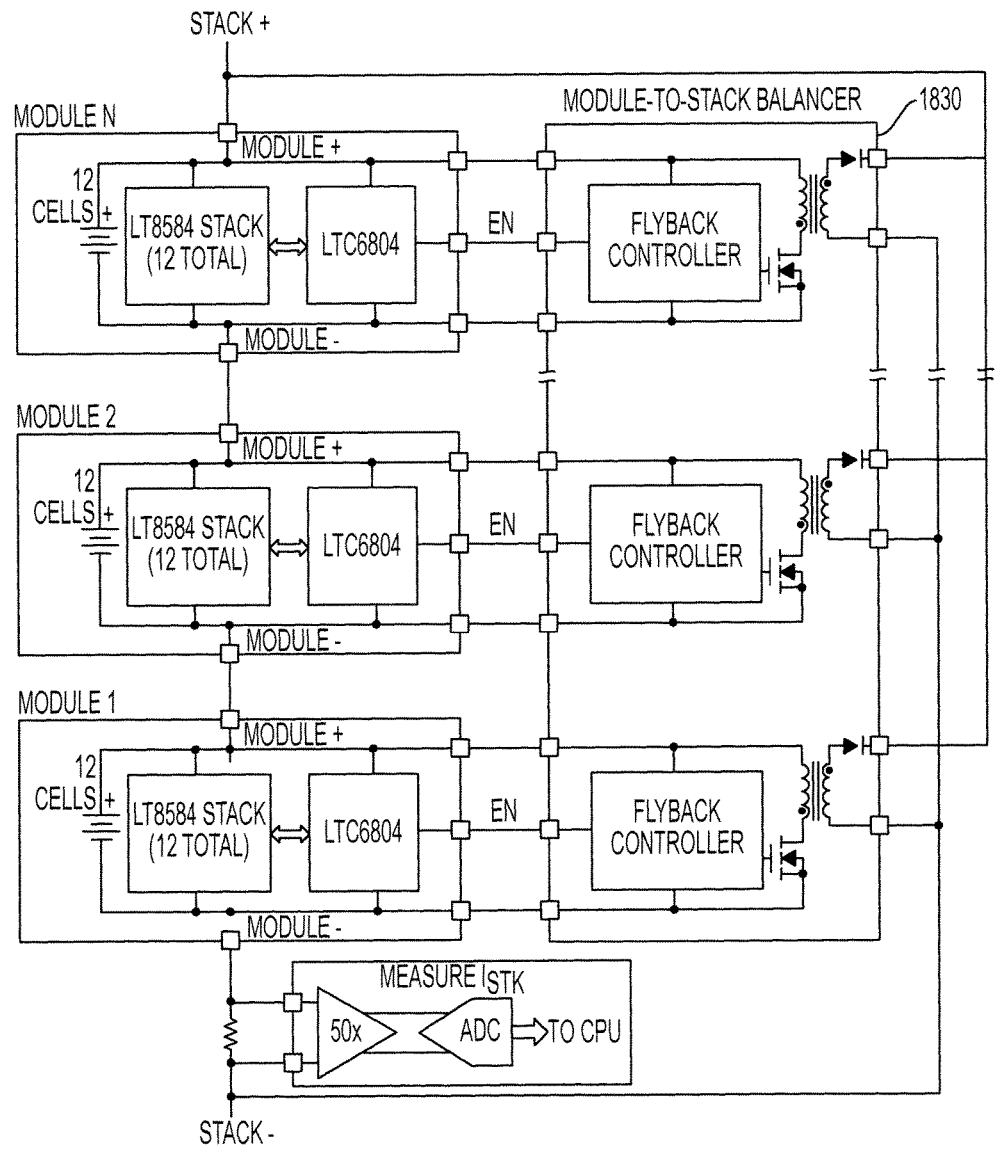
FIG. 18 illustrates the use of a module-to-stack balancer with flyback converters configured as a unidirectional discharger; although, the converters may be configured as unidirectional chargers or bidirectional converters.

FIG. 18 illustrates another exemplary BSM 1800. The BSM 1800 is a module-to-stack balance. To this end, the BSM 1800 includes a plurality of modules 1–N and a module-to-stack balancer 1830. Each of the modules 1–N may correspond to the BSMs 100 shown in FIG. 1, which are connected to the BSM chip 1830. Each of the modules 1–N may require an enable signal to enable balancing on a particular module, labeled EN in FIG. 18, sent from the battery module connected to that particular module-to-stack balancer, typically a GPIO channel from the BSM IC 1830. The decision is made using algorithms programmed in a processor connection to the BSM IC communication port. The decision is based on the relative module voltage in comparison to the average module voltage in the entire battery stack. In the case of FIG. 18, all modules having a voltage higher and/or a stored charge higher than the average module voltage and/or the average stored charge plus the balancing threshold will command its module-to-stack balancer to enable discharging.

FIG. 18 shows the use of a module-to-stack balancer with flyback converters configured as a unidirectional discharger; although, the converters may be configured as unidirectional chargers or bidirectional converters. Charge is transferred from each individual module and returned to the entire battery stack, STACK+ and STACK−. All high-voltage lines are contained to the module-to-stack converters; however, a voltage clamp should be placed in parallel to each module to prevent high-voltage from appearing across the MODULE+ and MODULE− terminals during module replacement.

Some applications may require more balancing current than allowed by a single monitoring integrated circuit. The single monitoring integrated circuit may allow a balancing current of up to 2.5 amps. Therefore, the applications that require balancing current of higher than 2.5 amps (e.g., 5 amps) due to larger capacity or lower balancing time may add more than one integrated monitoring circuit in parallel either as slaves or masters. This may increase the amount of discharge current taken off each cell. To this end, the balancer on each channel may be comprised of several smaller balancers in parallel. The balancers may be either monolithic with the power switch integrated into balancer IC like the LT8584 or a controller with an external discrete power switch like the LTC3300, LT3751, or LT3750 solutions.

Figure 19A:
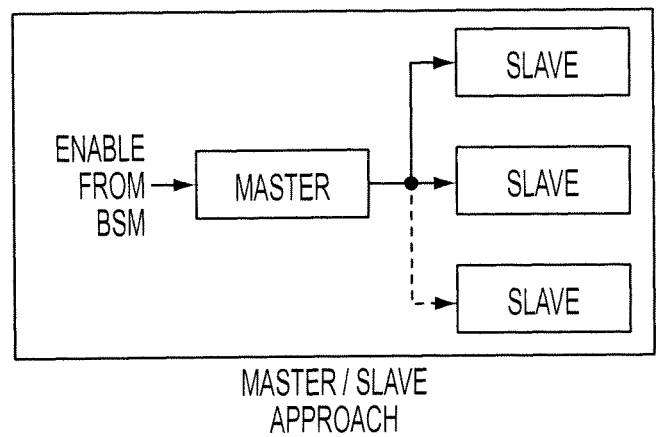
FIG. 19A illustrates a plurality of parallel slave balancers.
Figure 19B:
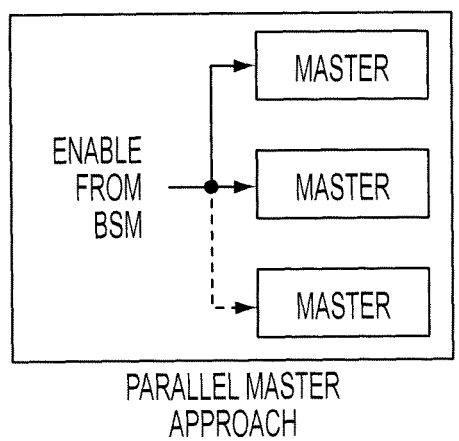
FIG. 19B illustrates a plurality of parallel master balancers.

FIG. 19A illustrates a plurality of parallel slave balancers. FIG. 19B illustrates a plurality of parallel master balancers. In FIG. 19A, in addition, the individual balancers may be of a multi-phase type. The master/slave approach shown in FIG. 19A may use a single master balancer that enables one or more slave balancers. This architecture can be configured as follows:

| Master Balancer | Slave Balancer(s) |
|---|---|
| Monolithic | Monolithic |
| Monolithic | Controller |
| Controller | Monolithic |
| Controller | Controller |

In FIG. 19B, all master balancers are shown such that each balancer is controlled in parallel by the same enable signal. The parallel enable signal may command any combination of monolithic or controller type power converters as listed in the previous table.

In another implementation, instead of voltage compensated balancing, the system may be configured to balance the series-stacked cells based on the State of Charge (SOC) of each cell within the series-stacked cells. The voltage balancing can be beneficial but the ultimate objective may be to balance the stored charge in each cell. The charge balancing can be more efficient and can increase stability of the balancing system. This is because in the charge balancing, upon determining the amount that should be either transferred to the cell or from the cell, the balancer remains on until that specific amount of charge has been transferred without having to continuously monitor open cell voltage. In contrast, in the voltage compensated balancing, the open cell voltage may have to be continuously monitored until a target value is reach (e.g., the open cell voltage is balanced within the battery stack). However, since some of the components used in measuring the open cell voltage may not have stable value throughout the balancing such as, for example, the voltage droop component as shown in FIG. 17, the open cell voltage may not be exact and may not converge to the desired value within a specific threshold of time. Nevertheless, voltage compensated balancing may be used to balance series-stacked cells to extract all stored charge. Several methods exist to balance based on the absolute cell voltage. This method may be used when maximizing the stored charge during the either end of the charge/discharge cycle. During other operations of the battery pack, the balancing may be based on the SOC of the battery, in particular, the absolute stored charge.

It may be beneficial to balance based on the stored charge in order to reduce the required peak balancing current. Equation 11 illustrates the relationship between time and balancing current where mismatch is given in a percentage of overall capacity. For example, if the capacity of the cell is calculated to be 80%, the mismatch would be 20%. Voltage compensated balancing may allow balancing over the majority of the discharge or charge cycle and may minimize the required balancing current. To this end, the DC/DC converter size, weight, and cost may also be reduced.

$$\text{time}(hr) = \frac{\text{Mismatch} \cdot \text{Capacity}}{I_{BAL}} \quad \text{(Equation 11)}$$

Figure 20:
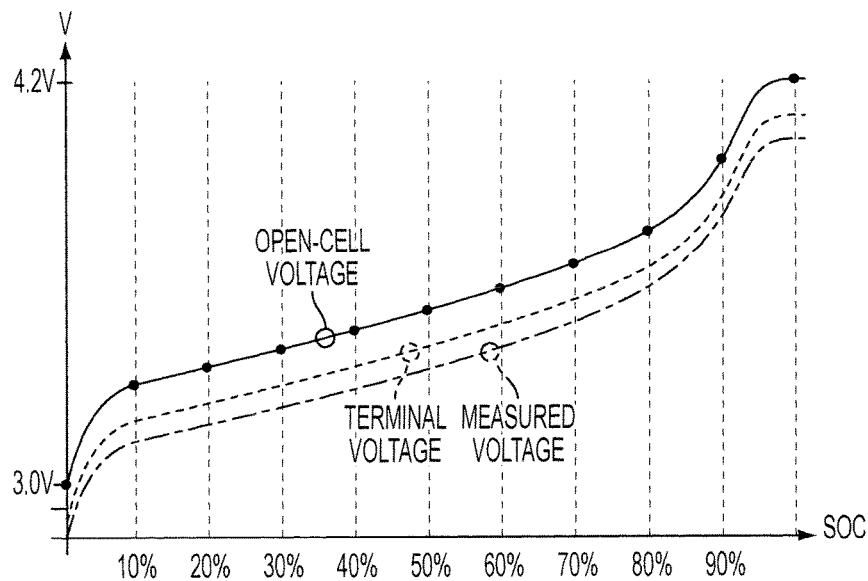
FIG. 20 illustrates a particular curve relating open cell voltage to State of Charge (SOC) as well as the loaded terminal voltage and Battery Stack Monitor (BSM) measured voltage.

Balancing based on stored charge requires cell data relating the open-cell voltage to SOC and coulomb counting. FIG. 20 illustrates a particular curve relating open cell voltage to SOC as well as the loaded terminal voltage and BSM measured voltage. Several points from the open cell curve may be stored in a look-up table, perhaps a point for every 10% or every 1%, to determine the percent of SOC based on the open cell voltage. Open cell voltage may be extracted using the combined IR, voltage droop, and common-mode compensation discussed above with respect to FIGS. 1-19.

The percent based SOC curves may remain substantially identical for each cell in the battery stack, even during aging. Aging of a particular cell may change the absolute capacity of the cell, hence the need for balancing. The SOC look-up table may require a family of open-cell voltage curves or points based on constant cell temperature. Each cell temperature may be measured using a NTC or buried junction diode like the 2N3904 transistor. Each cell temperature sensor may be read by the BSM IC using a multi-input analog MUX driving one of the BSM's GPIO pins. Alternatively, an extra external pin associated with an auxiliary channel may be added to the analog MUX (circuit 240 in FIG. 2) of the monitoring integrated device to measure each cell temperature sensor.

The SOC look-up table may also require a family of open-cell voltage curves or points based on constant cell load current. The overall current of each cell is determined by mesh of currents including the cell discharge current measured using the integrated monitor device, the module current measured using circuit 140 in FIG. 1, and the stack current measured using a hall-effect current sensor or shunt resistor circuit talking to a CPU, shown in FIG. 18. An alternative method may use the voltage droop compensation to determine or generate the constant load current family of curves.

The SOC look-up table may also require a family of open-cell voltage curves or points based on the discharge/charge hysteresis. Alternatively, the hysteresis may be a function or analytical solution based on empirical data. Charge slope measurements like that in Equation 12 may also be used to determine the presence of hysteresis.

Figure 21:
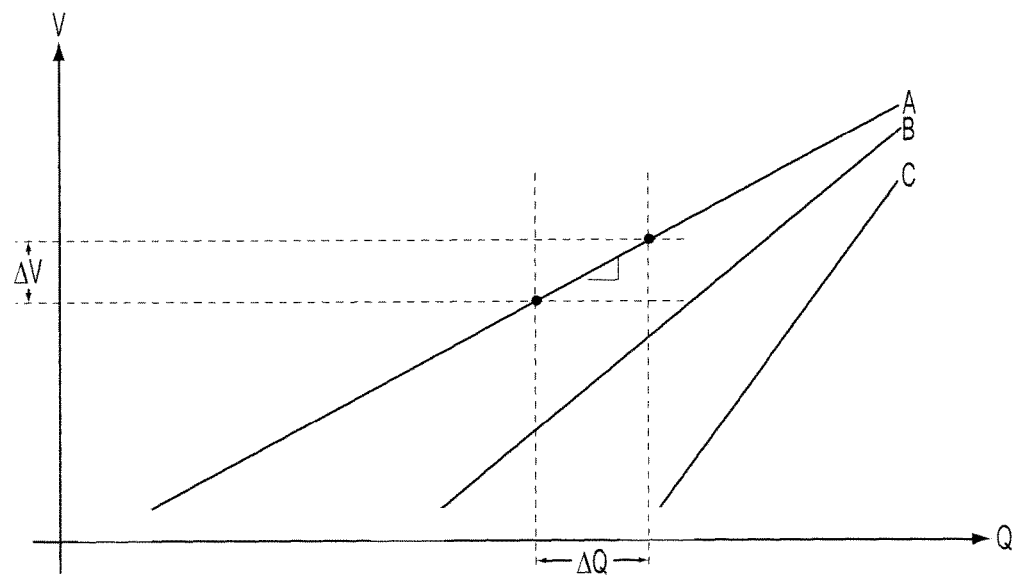
FIG. 21 illustrates charge slopes for three cells with different full-charge capacities.

Coulomb counting may be required to determine the relative capacity of a particular cell in relation to all other cells in the battery stack. FIG. 21 illustrates a snap shot of a portion of charge slopes for three cells with different full-charge capacities. The slope of each line may be expressed as equation x, where n is a particular cell.

$$\text{Slope}_n = \Delta V_n / \Delta Q_n \quad \text{(Equation 12)}$$

The ability to accurately measure individual balancing current may provide the user with means to measure the amount of charge removed from the cell as well as the remaining charge stored in the cell. The following equation 13 shows the relation of charge (Q) and is expressed in coulombs (C):

$$Q_n = \int (I_n + I_{MOD,m} + I_{STK}) \cdot dt \quad \text{(Equation 13)}$$

$I_n$ is the average discharge or balancing current measured from a particular cell using the integrated monitoring device, $I_{MON,m}$ is the module current measured using circuit 140 and 142 in FIG. 1, and $I_{STK}$ is the stack current measured using a hall-effect or current sense circuit talking to a GPIO port of the BSM. Thus, one additional parameter is needed to calculate charge and that is the parameter t or time. The time parameter is the total time of interest, particularly between the two points used to measure a particular cell's stored charge. Time may be tracked using a microprocessor used to control the BMS.

Current measurement errors may directly affect the accuracy of stored charge calculation. For example, a 3% current measurement error may cause a 3% error in stored charge calculation. Relative error within a particular module may be reduced to less than 1% by exploiting the measurements used in IR drop compensation. The current measurements may be adjusted by a correction factor:

$$I_{n,A} = \left(\frac{R_{n,A}}{R_{n,B}}\right) \cdot I_{n,B} \quad \text{(Equation 14)}$$

$I_{n,A}$ is the corrected current measurement, $I_{n,B}$ is the measured current using the monitoring device, and $R_{n,A}$ and $R_{n,B}$ are resistances associated with a line connecting a Vcell pin of the monitoring circuit with the plus terminal of the cell. Absolute current measurement error may be reduced by referencing the current measurement of the monitoring device connected to cell 1 of each module to a known resistor with a tolerance of 1% or less.

The charge slope for each cell may be measured to calculate its capacity. Charge slope measurement may require coulomb counting in conjunction with the percent SOC look-up tables based on $V_{OCV,n}$, the open cell voltage. The open cell voltage may be extracted using the composite IR drop, voltage droop, and common-mode compensation. Capacity is related in equation 15 for a particular cell n. Typically, a larger change in % SOC used for the Capacity calculation, the more accurate a Capacity measurement becomes.

$$Capacity_n = \left(\frac{1}{\Delta\% \; SOC_n}\right) \cdot \Delta Q_n \quad \text{(Equation 15)}$$

The final objective may be to extract each cell's stored charge at any one time. This allows the balancing algorithm to use stored charge as the parameter to balance, not open cell voltage, and results in an increase in balancing efficiency. A balanced system based on stored charge may have open cell voltages that are different among each other throughout the battery package normal operating range; however, the open cell voltages will converge and become equal when discharging the series-stack of cell to 0% SOC. Likewise, the open cell voltage will converge and equal when charging the series-stack of cells to 100% SOC. The equation that governs the instantaneous stored charge is related in Equation 16 for a particular cell n.

$$Q_n = \% \; SOC_n \cdot Capacity_n \quad \text{(Equation 16)}$$

Figure 22:
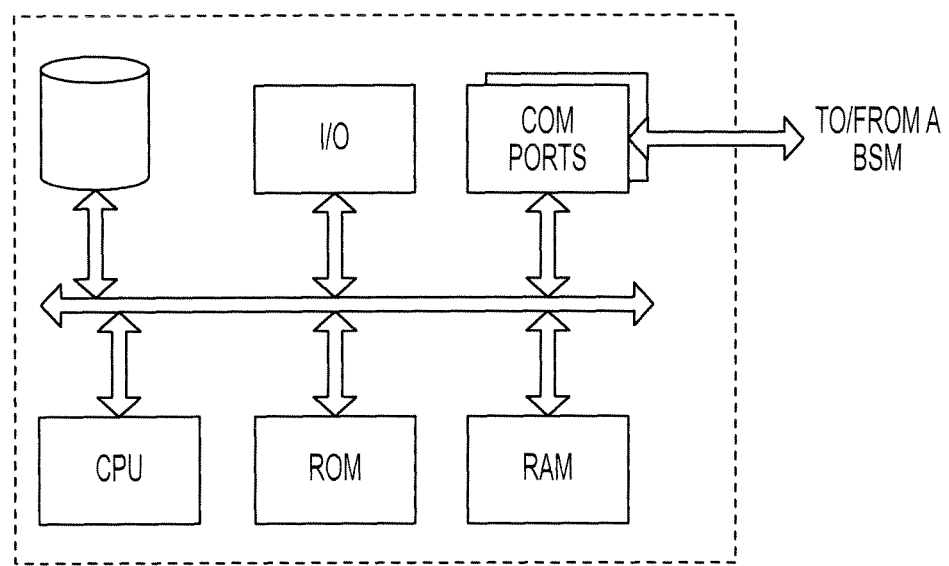
FIG. 22 illustrates functional block diagram illustrations of a firmware associated with the monitoring integrated circuit of the instant application.

FIG. 22 illustrates functional block diagram illustrations of a firmware associated with the monitoring integrated circuit of the instant application. It is believed that those skilled in the art are familiar with the structure, programming and general operation of such computer equipment and as a result the drawings should be self-explanatory. The firmware, for example, includes a data communication interface for packet data communication. The firmware also includes a central processing unit (CPU), in the form of one or more processors, for executing program instructions. The firmware platform typically includes an internal communication bus, program storage and data storage for various data files to be processed and/or communicated by the firmware to the BSM, although the firmware often receives data via the BSM. The hardware elements, operating systems and programming languages are conventional in nature, and it is presumed that those skilled in the art are adequately familiar therewith.

Hence, aspects of the methods of voltage compensated active cell balancing outlined above including but not limited to IR compensation, Voltage Droop compensation, and common-mode compensation may be embodied in programming. Program aspects of the technology may be thought of as "products" or "articles of manufacture" typically in the form of executable code and/or associated data that is carried on or embodied in a type of machine readable medium. "Storage" type media include any or all of the tangible memory of the computers, processors or the like, or associated modules thereof, such as various semiconductor memories, tape drives, disk drives and the like, which may provide non-transitory storage at any time for the software programming. A machine readable medium may take many forms, including but not limited to, a tangible storage medium, a carrier wave medium or physical transmission medium.

Other implementations are contemplated. For another example, the monitoring integrated circuit may include global safety parameters. There are global maximum and minimum cell voltages, maximum balance time, and maximum board level IC level temperature and cell temperature safety parameters in place that cause a global shutdown of the BMS/balancer circuit if crossed. These values may vary from battery chemistry to battery chemistry so the parameters are user configurable. The maximum cell voltage may prevent from charging a cell pass a specific threshold value. The cells should not be overcharged because that may cause drastic failure in the system and may even cause fire in some cases. To this end, the system may have a programmable feature for setting a threshold such that when the threshold is reached or passed, everything turns off and the cell is no longer charged. No further balancing may occur and an error signal may be generated to inform the system operator that the voltage threshold has been violated.

Similarly, the minimum cell voltage may prevent from discharging a cell pass a specific threshold value. The cell should not be discharged if its voltage is at or below a specific threshold value because that may cause drastic failure in the system and reduce battery life. To this end, the system may have a programmable feature for setting a threshold such that when the threshold is reached or passed, everything turns off and the cell is no longer discharged. No further balancing may occur and an error signal may be generated to inform the system operator that the voltage threshold has been violated.

The maximum balance time may define the maximum time the monitoring integrated circuit can be on for balancing a cell. There are two modes of balancing: a manual balancing and automatic balancing. In the manual mode, the BMS operator can select a cell for balancing. In this mode, the maximum balance time will protect against a BMS operator who forgets to turn the balancer off. This way, the system avoids discharging a cell completely and damaging the battery.

Auto-balancing may be based on the average voltage or the average stored charge of either the entire system or an individual module and a user determined threshold. If a cell exceeds or drops below the average voltage or the average stored charge +/− this user threshold, it may be targeted for balancing. When a cell is above the average voltage or stored charge + the user threshold it will be turned on for balancing. This immediately drops the effective measured voltage which in a typical system would put this channel out of the balancing threshold range. However, the BMS may use the calculated wire impedance, cell impedance and battery ESR to determine the floating voltage of the cell. This back-calculated or compensated voltage may be used as well as a hysteresis value to determine when to turn the high cell off. This back-calculated voltage value may also be used to calculate the average voltage of the BMS as well as the stored charge. The cells immediately next to a unit that has been turned on may show an effective measured voltage that is higher than its actual float voltage. By using the calculated wire impedance, cell impedance and battery ESR, the actual floating voltage of such cells may be determined. This back-calculated voltages value may be used to calculate the average voltage of the system as well as the stored charge and SOC. This back-calculated voltage value may also be used to determine whether or not the cell actually needs balancing.

When a cell is below the average voltage or stored charge − the user threshold, it may be marked for charging. When a unit is marked for charging within a module, all cells but units marked for charging may be switched on. The cells immediately next to a unit that has been turned on may show an effective measured voltage that is higher than its actual float voltage. By using the calculated wire impedance, cell impedance and battery ESR we are able to determine the actual floating voltage of such cells. This back-calculated voltage value will be used to calculate the average voltage of the system. This back-calculated voltage value will also be used to determine whether or not the cell actually needs to be charged by inferring SOC based on the open cell voltage. The cells that are turned on will show an effective measured voltage that is lower than the actual float voltage of the cell. However, the system uses the calculated wire impedance, cell impedance and battery ESR to determine the floating voltage of these cells. This back-calculated voltage as well as a hysteresis value may be used to determine when to turn the cells off, should they also need charging. This back-calculated voltage value may also be used to calculate the average voltage and the SOC of the system.

For another example, the system may include common-mode shift compensation. The common-mode shift compensation is configured to compensate for a sudden load spike in the system. Such a load spike would cause a common mode shift which potentially could cause a false handshake positive or a false handshake negative. By looking at channels that should be unaffected by a channel turning on or off, we can then establish if a common mode shift had occurred. Looking at the channel before and after would easily show any offsets that have been generated and a simple addition of that offset to any other channel would then compensate for the shift.

For another example, the system may measure multiple channels at a time. The adjacent channels may not be mode switched at the same time due to the handshaking protocol which causes a voltage step. However, an algorithm that switches each channel on and off one at a time would take a very large amount of time, such an algorithm would end up taking the sum of all the handshaking windows. In order to avoid this, a multi-step channel switch may be used where the board is divided up into different sections (typically every third or fourth channel like that in FIGS. 5a and 5b) and switch the different sections one after another after the handshaking window for each individual section has passed. This may allow for reduced time taken to change modes on large blocks of channels.

For another example, to speed up the measurement process 3 channels may be measured at time when trying to measure current, temperature or loaded voltage. The 3 channels may be the maximum in order to avoid channel to channel effects on the measurement while still allowing for common mode shift compensation. When one channel is on, it may affect the channel immediately above and below it causing offsets due to current. With 3 channels at a time, there is enough of a buffer between channels to avoid any offset, enabling reliable measurements to use to calculate temperature, current and load voltage which in turn can be used to measure values like cell impedance, wire impedance, Battery ESR and compensation impedance.

For another example, although various components are shown to be separate (e.g., the BSM chip 130 and the monitoring integrated circuit 110), they may be incorporated together. For another example, although the implementations of the instant application are described to balance lithium ion batteries, they can also be used for balancing super capacitors and lithium ion capacitors.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A monitoring device that determines an open cell voltage during battery stack balancing, the monitoring device comprising:
    an input terminal that receives an input signal from a battery system management (BSM);
    an output terminal that outputs cell parameters used to determine an open cell voltage associated with one of a plurality of cells within the battery stack connected to the monitoring device based on the input signal received from the BSM;
    the monitoring device having a configuration that:
        measures a cell voltage associated with the one of the plurality of cells within the battery stack;
        determines a voltage drop associated with a measured balancing current by taking into consideration balancing current associated with the one of the plurality of cells, a cell above the one of the plurality of cells, and a cell below the one of the plurality of cells, and current simultaneously flowing through the plurality of cells;
        calculates the open cell voltage during balancing, stack loading, and stack charging by adjusting the measured cell voltage based on the voltage drop; and
        actively balances multiple cells in the battery stack based on the calculated open cell voltage, wherein:
            the active balancing and the calculating the open cell voltage are performed concurrently, and
            the actively balances includes removal of charge from a cell and returning that removed charge to one or more other cells in the stack.

2. The monitoring device of claim 1, wherein the monitoring device is between the BSM and the battery stack and further includes:
    an integrated power switch; and
    an analog multiplexer that provides on the output terminal a measurable parameter based on the input signal received on the input terminal, the measuring parameter includes a cell voltage of the one of the plurality of the cells within the battery stack with balancing enabled, the cell voltage with balancing disabled, a voltage proportional to balancing current, a voltage proportional to internal die temperature of the monitoring device, and/or a handshake voltage.

3. The monitoring device of claim 2, wherein the handshake voltage determines the accuracy of measurement readings by the BSM.

4. The monitoring device of claim 1, further comprising a current sense amplifier for measuring a balancing current, wherein the monitoring device actively monitors the balancing current of the monitoring device and calculates the voltage drop based on the monitored balancing current to avoid overcharging or undercharging the one of the plurality of the cells during balancing.

5. The monitoring device of claim 1, wherein the monitoring device includes a monolithic flyback DC/DC converter.

6. The monitoring device of claim 1, wherein the monitoring device:
    activates the monitoring device on a first negative edge of an input signal received on the input terminal,
    initiates a time window defining a window of time within which the monitoring device is active,
    counts number of negative pulses on the input terminal during the time window,
    outputs a handshake voltage on the output terminal corresponding to a last known count of the negative pulses on the input terminal, and
    outputs a voltage proportional to a cell parameter based on the number of negative pulses counted once the time window expires.

7. The monitoring device of claim 1, wherein the monitoring device is connected to the battery stack via a single-wire battery connection in which the ground terminal of the monitoring device to the battery stack shares a common path with a Vcell pin of another monitoring device to the battery stack.

8. The monitoring device of claim 7, wherein the the open cell voltage is calculated based on the following formula:

$$V_{n,A} = V_{n,B} + I_n \cdot (R_{n-1,A} + R_{n,B}) - I_{n-1} \cdot R_{n-1,B} - I_{n+1} \cdot R_{n,A} + (I_n - I_{MOD}) \cdot R_{n,CELL},$$

where:
    $V_{n,A}$ is the open cell voltage associated with the one of the plurality of cells,
    $V_{n,B}$ is the measured cell voltage by the monitoring device for one of the plurality of cells,
    $R_{n-1,A}$ and $R_{n-1,B}$ are resistances associated with a line connecting a ground terminal of the monitoring device with a negative terminal of the cell, $R_{n,A}$ and $R_{n,B}$ are resistances associated with a line connecting a Vcell pin of the monitoring circuit with a plus terminal of the cell, $R_{n,CELL}$ is a resistance accounting for all impedances not having a shared path with a cell below and a cell above the one of the plurality of cells, $I_n$ is a balancing current associated with the one of the plurality of cells, $I_{n-1}$ is a balancing current associated with the cell below the one of the plurality of cells, $I_{n+1}$ is a balancing current associated with the cell above the one of the plurality of cells, and $I_{MOD}$ is the current simultaneously flowing through the plurality of cells.

9. The monitoring device of claim 1, wherein the monitoring device is connected to the battery stack via a two-wire battery connection in which a ground connection of the monitoring device to the battery stack does not share a common path with a Vcell connection of a second monitoring device to the battery stack, the second monitoring circuit being adjacent and below the monitoring circuit.

10. The monitoring device of claim 9, wherein the monitoring device calculates an impedance associated with the monitoring circuit based on the following formula:

$$R_n = \frac{V_{n,MODE0} - V_{n,MODE1} - (I_n - I_{MOD}) \cdot R_{n,CELL}}{I_n},$$

where:

$V_{n,MODE0}$ corresponds to a cell voltage of the one of the plurality of cells with the monitoring device being disabled, $V_{n,MODE1}$ corresponds to a cell voltage of one of the plurality of cells with the monitoring device being enabled, $I_n$ is a balancing current associated with the one of the plurality of cells, $I_{MOD}$ is the current simultaneously flowing through the plurality of cells, and $R_{n,CELL}$ is a Direct Current Resistance (DCR) and connection resistance of one of the plurality of cells.

11. The monitoring device of claim 10, wherein the monitoring device calculates the open cell voltage based on the following formula with two-wire battery connections:

$$V_{n,A} = V_{n,B} + I_n \cdot R_n + (I_n - I_{MOD}) \cdot R_{n,CELL} - I_{n-1} \cdot R_{n-1},$$

where:

$V_{n,A}$ is the open cell voltage associated with the one of the plurality of cells, $V_{n,B}$ is the measured cell voltage by the monitoring device for the one of the plurality of cells, $R_n$ is the impedance associated with a $V_{CELL}$ pin of monitoring device connected to the one of the plurality of cells, $R_{n-1}$ is an impedance associated with a monitoring device connected to a cell below the one of the plurality of cells, $R_{n,CELL}$ is the DCR and connection resistance of one of the plurality of cells, $I_n$ is a balancing current associated with the one of the plurality of cells, $I_{n-1}$ is a balancing current associated with the cell below the one of the plurality of cells, and $I_{MOD}$ is the current simultaneously flowing through the plurality of cells.

12. The monitoring device of claim 1, the monitoring device measures a voltage droop associated with the one of the plurality of cells and calculates the open cell voltage based on the voltage droop and the voltage drop.

13. The monitoring device of claim 1, wherein the voltage droop is added to the voltage drop in calculating the open cell voltage after threshold amount time of the monitoring device associated with the one of the plurality of cells turns ON.

14. A system comprising:
a plurality of modules, each module including a battery stack, a monitoring circuit of claim 1 for balancing one of the plurality of cells of the battery stack, and a module system management for measuring the open voltage, wherein measuring the open cell voltage and balancing the cell are performed concurrently;
a module-to-stack balancer coupled to the plurality of modules and including a plurality of balancers each associated with one of the plurality of modules, the module-to-stack balancer that actively balances a voltage or stored charge among the modules, wherein the actively balances includes removal of charge from a cell and returning that removed charge to one or more other cells in the stack.

15. An IR compensated active cell balancing method comprising steps of:
receiving an input signal at an input terminal of a monitoring device and from a battery system management (BSM);
responsive to the input signal, activating the monitoring device for balancing one of the plurality of cells within a battery stack coupled to the monitoring device;
measuring a cell voltage associated with one of the plurality of cells;
measuring a voltage drop associated with a measured balancing current by taking into consideration balancing current associated with the one of the plurality of cells, a cell above the one of the plurality of cells, and a cell below the one of the plurality of cells, and current simultaneously flowing through the plurality of cells;
calculating via a processor an open cell voltage associated with the one of the plurality of cells by adjusting the measured cell voltage based on the measured voltage drop; and
actively balancing the battery stack based on the processor calculated open cell voltage, wherein:
balancing and calculating the open cell voltage are performed concurrently; and
the actively balancing includes removal of charge from a cell and returning that removed charge to one or more other cells in the stack.

16. The method of claim 15, further comprising providing on the output terminal a measurable parameter based on the input signal received on the input terminal, wherein the measuring parameter includes a cell voltage of the one of the plurality of the cells within the battery stack with balancing enabled, the cell voltage with balancing disabled, a voltage proportional to balancing current, a voltage proportional to internal die temperature of the monitoring device, and/or a handshake voltage.

17. The method of claim 15, further comprising:
actively monitoring the balancing current of the monitoring device; and
calculating the voltage drop based on the monitored balancing current to avoid overcharging or undercharging the one of the plurality of the cells during balancing.

18. The method of claim 15, wherein the monitoring device includes a monolithic flyback DC/DC converter.

19. The method of claim 15, wherein activating the monitoring device includes activating the monitoring device on a first negative edge of an input signal received on the input terminal, the method further comprising:
   initiating a time window defining a window of time within which the monitoring device is active;
   counting number of negative pulses on the input terminal during the time window;
   outputting a handshake voltage on the output terminal corresponding to a last known count of the negative pulses on the input terminal; and
   outputting a voltage proportional to a cell parameter based on the number of negative pulses counted once the time window has expired.

20. The method of claim 15, wherein calculating the open cell voltage includes calculating the open voltage based on the following formula:

$$V_{n,A} = V_{n,B} + I_n \cdot (R_{n-1,A} + R_{n,B}) - I_{n-1} \cdot R_{n-1,B} - I_{n+1} \cdot R_{n,A} + (I_n - I_{MOD}) \cdot R_{n,CELL},$$

where:
$V_{n,A}$ is the open cell voltage associated with the one of the plurality of cells,
$V_{n,B}$ is the measured cell voltage by the monitoring device for the one of the plurality of cells,
$R_{n-1,A}$ and $R_{n-1,B}$ are resistances associated with a line connecting a ground terminal of the monitoring device with a negative terminal of the cell,
$R_{n,A}$ and $R_{n,B}$ are resistances associated with a line connecting a Vcell pin of the monitoring circuit with a plus terminal of the cell,
$R_{n,CELL}$ is a resistance accounting for all impedances not having a shared path with a cell below and a cell above the one of the plurality of cells,
$I_n$ is a balancing current associated with the one of the plurality of cells,
$I_{n-1}$ is a balancing current associated with the cell below the one of the plurality of cells,
$I_{n+1}$ is a balancing current associated with the cell above the one of the plurality of cells, and
$I_{MOD}$ is the current simultaneously flowing through the plurality of cells in a module including the monitoring device and the BSM.

21. The method of claim 15, further comprising calculating an impedance associated with the monitoring circuit for calculating the open cell voltage based on the following formula:

$$R_n = \frac{V_{n,MODE0} - V_{n,MODE1} - (I_n - I_{MOD}) \cdot R_{n,CELL}}{I_n},$$

where:
$V_{n,MODE0}$ corresponds to a cell voltage of the one of the plurality of cells with the monitoring device being disabled,
$V_{n,MODE1}$ corresponds to a cell voltage of the one of the plurality of cells with the monitoring device being enabled,
$I_n$ is a balancing current associated with the one of the plurality of cells,
$I_{MOD}$ is the current simultaneously flowing through the plurality of cells, and
$R_{n,CELL}$ is a Direct Current Resistance and connection resistance of one of the plurality of cells.

22. The method of claim 21, wherein calculating the open cell voltage includes calculating the open voltage based on the following formula:

$$V_{n,A} = V_{n,B} + I_n \cdot R_n + (I_n - I_{MOD}) \cdot R_{n,CELL} - I_{n-1} \cdot R_{n-1},$$

where:
$V_{n,A}$ is open cell voltage associated with the one of the plurality of cells,
$V_{n,B}$ is a measured cell voltage by the monitoring device for the one of the plurality of cells,
$R_n$ is the impedance associated with the Vcell pin of monitoring device connected to the one of the plurality of cells,
$R_{n-1}$ is an impedance resistance associated with a monitoring device connected to a cell below the one of the plurality of cells,
$R_{n,CELL}$ is the DCR and connection resistance of one of the plurality of cells,
$I_n$ is a balancing current associated with the one of the plurality of cells,
$I_n$ is a balancing current associated with the cell below the one of the plurality of cells, and
$I_{MOD}$ is the current simultaneously flowing through the plurality of cells in a module including the monitoring device and the BSM.

23. A monitoring device comprising:
an input terminal that receives an input signal from a battery system management (BSM);
an output terminal that outputs cell parameters used to determine an open cell voltage associated with one of a plurality of cells within the battery stack connected to the monitoring circuit based on the input signal received from the BSM;
wherein the monitoring device:
   measures a cell voltage associated with the one of the plurality of cells within the battery stack;
   determines a voltage drop associated with a measured balancing current by taking into consideration balancing current associated with the one of the plurality of cells, a cell above the one of the plurality of cells, and a cell below the one of the plurality of cells, and current simultaneously flowing through the plurality of cells;
   calculates the open cell voltage by adjusting the measured cell voltage based on the measured voltage drop;
   calculates capacity associated with the one of the plurality of cells;
   calculates stored charge of the one of the plurality of cells based on the calculated capacity;
   actively balances the battery stack based on the calculated stored charge, wherein:
   the active balancing and the calculating the open cell voltage are performed concurrently; and
   the actively balances includes removal of charge from a cell and returning that removed charge to one or more other cells in the stack.

24. The monitoring device of claim 23, wherein the monitoring device calculates the capacity based on a following formula:

$$Capacity_n = \left(\frac{1}{\Delta\% \, SOC_n}\right) \cdot \Delta Q_n,$$

where:
$\Delta Q_n$ represents amount of change in the stored charge in the one of the plurality of cells within a time period, Δ% $SOC_n$ represents percentage change in the State of Charge (SOC) of the one of the plurality of cells within the time period, and $Capacity_n$ represents capacity of the one of the plurality of cells.

25. The monitoring device of claim 24, wherein to calculate the open cell voltage, the memory further stores executable instructions to calculate a first open cell voltage and a second open cell voltage and to calculate the percentage change in the SOC, the memory further stores executable instructions to utilizes a look-up table that correlates the first open cell voltage with a first percentage SOC and the second open cell voltage with the second percentage SOC such that the difference between the first percentage SOC and the second percentage SOC corresponds to the percentage change in the SOC.

26. The monitoring device of claim 25, the monitoring device calculates the capacity based on a following formula:

$$Q_n = \% \, SOC_n \cdot Capacity_n,$$

where:

% $SOC_n$ represents percentage SOC of the one of the plurality of cells, and $Capacity_n$ represents capacity of the one of the plurality of cells.

* * * * *